(12) United States Patent
Tanikawa et al.

(10) Patent No.: US 9,959,436 B2
(45) Date of Patent: May 1, 2018

(54) READER FOR RFID TAG FOR NEAR-FIELD WIRELESS COMMUNICATION AND NEAR-FIELD WIRELESS COMMUNICATION SYSTEM

(71) Applicant: Sony Computer Entertainment Inc., Tokyo (JP)

(72) Inventors: Masakazu Tanikawa, Chiba (JP); Katsuyoshi Onishi, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 130 days.

(21) Appl. No.: 14/768,776

(22) PCT Filed: Dec. 16, 2013

(86) PCT No.: PCT/JP2013/007391
§ 371 (c)(1),
(2) Date: Aug. 19, 2015

(87) PCT Pub. No.: WO2014/136167
PCT Pub. Date: Sep. 12, 2014

(65) Prior Publication Data
US 2016/0004894 A1    Jan. 7, 2016

(30) Foreign Application Priority Data
Mar. 8, 2013   (JP) .................... 2013-046563

(51) Int. Cl.
*G06K 7/10* (2006.01)
*G06K 19/077* (2006.01)
(Continued)

(52) U.S. Cl.
CPC ..... *G06K 7/10356* (2013.01); *G06K 7/10128* (2013.01); *G06K 7/10227* (2013.01);
(Continued)

(58) Field of Classification Search
CPC .......... G06K 7/10356; G06K 19/0724; G06K 19/07773; G06K 7/10128; H04B 5/0062
See application file for complete search history.

(56) References Cited

U.S. PATENT DOCUMENTS 8,506,401 B2    8/2013   Emori
2005/0054293 A1*  3/2005   Bann .................. G01S 13/751
                                        455/41.3
(Continued)

FOREIGN PATENT DOCUMENTS

CN           1867383 A      11/2006
CN         102039045 A       5/2011
(Continued)

OTHER PUBLICATIONS

Office Action for corresponding CN Application 201380074193.9, 20 pages, dated Aug. 1, 2016.
(Continued)

*Primary Examiner* — Thomas Alunkal
(74) *Attorney, Agent, or Firm* — Matthew B. Dernier, Esq.

(57) ABSTRACT

In a reader for a radio frequency identification (RFID) tag for near-field wireless communication, an antenna selection switch includes a plurality of antennae arranged with an extent within a predetermined range for transmitting and receiving data to and from an RFID tag, and selects one antenna to be used for transmission and reception of data from among the plurality of antennae. A detection part acquires, when a carrier wave transmitted from the RFID tag is received by any of the plurality of antennae, information indicative of an antenna selected by the antenna selection switch under the control of an antenna changeover controlling part.

14 Claims, 22 Drawing Sheets

(51) Int. Cl.
*G06K 19/07* (2006.01)
*H04B 1/59* (2006.01)
*H04B 5/00* (2006.01)
*H04B 7/06* (2006.01)
*H04B 7/08* (2006.01)
*A63F 13/65* (2014.01)

(52) U.S. Cl.
CPC ... *G06K 19/0724* (2013.01); *G06K 19/07773* (2013.01); *H04B 1/59* (2013.01); *H04B 5/0062* (2013.01); *H04B 7/061* (2013.01); *H04B 7/0822* (2013.01); *A63F 13/65* (2014.09); *H04B 7/0602* (2013.01); *H04B 7/0802* (2013.01)

(56) References Cited

U.S. PATENT DOCUMENTS

| | | | | |
|---|---|---|---|---|
| 2005/0219050 | A1* | 10/2005 | Martin | G01R 31/023 340/572.1 |
| 2005/0237198 | A1* | 10/2005 | Waldner | G06K 19/0707 340/572.7 |
| 2006/0076401 | A1* | 4/2006 | Frerking | G06K 7/0008 235/380 |
| 2006/0087406 | A1* | 4/2006 | Willins | G06K 7/0008 340/10.3 |
| 2006/0246403 | A1 | 11/2006 | Monpouet | |
| 2006/0267736 | A1* | 11/2006 | Tiernay | G06K 19/0707 340/10.51 |
| 2007/0222609 | A1* | 9/2007 | Duron | G06K 7/0008 340/572.7 |
| 2008/0129513 | A1* | 6/2008 | Bielas | G08B 13/1427 340/572.7 |
| 2009/0102610 | A1* | 4/2009 | Lance | G06K 7/0008 340/10.2 |
| 2010/0123559 | A1* | 5/2010 | Wilkinson | G06K 7/0008 340/10.4 |
| 2010/0164961 | A1 | 7/2010 | Horie | |
| 2012/0080845 | A1 | 4/2012 | Emori | |
| 2012/0223811 | A1* | 9/2012 | Wild | G01S 3/48 340/10.1 |

FOREIGN PATENT DOCUMENTS

| | | |
|---|---|---|
| CN | 102441273 A | 5/2012 |
| JP | 2003181133 A | 7/2003 |
| JP | 2005267073 A | 9/2005 |
| JP | 2005276086 A | 10/2005 |
| JP | 2006092464 A | 4/2006 |
| JP | 2006122439 A | 5/2006 |
| JP | 2006195925 A | 7/2006 |
| JP | 2006277669 A | 10/2006 |
| JP | 2007115067 A | 5/2007 |
| JP | 2007170818 A | 7/2007 |
| JP | 2008178499 A | 8/2008 |
| JP | 2009098012 A | 5/2009 |
| JP | 2009136556 A | 6/2009 |
| JP | 2009157530 A | 7/2009 |
| JP | 2010156796 A | 7/2010 |
| JP | 2010233802 A | 10/2010 |
| JP | 2012064123 A | 3/2012 |
| JP | 2012075781 A | 4/2012 |
| JP | 2013015901 A | 1/2013 |

OTHER PUBLICATIONS

International Search Report for corresponding Application PCT/JP2013/007391, dated Mar. 25, 2014.

International Preliminary Report on Patentability and Written Opinion corresponding Application PCT/JP2013/007391, 16 pages, dated Sep. 17, 2015.

Office Action for corresponding CN Application 201380074193.9, 32 pages, dated Jan. 2, 2018.

Jianzhong Fang, "Electronic Circuit Experiment" Hangzhou: Zhejiang University Press, pp. 132-134, (Dec. 31, 2009).

Office Action for corresponding JP Application 2016-085424, 6 pages, dated Feb. 27, 2018.

Augmented Reality AR engulfs Home Electronic Appliances, Nikkei Electronics, Nikkei BP, No. 1012, 15 pages, pp. 34-42, (Sep. 7, 2009).

Office Action for related U.S. Appl. No. 15/854,228, 15 pages, dated Feb. 8, 2018.

* cited by examiner

FIG. 9

| | | | | | | |
|---|---|---|---|---|---|---|
| 1 | 1,2 | 2 | 2,3 | 3 | 3,4 | 4 |
| 1,5 | 1,2<br>5,6 | 2,6 | 2,3<br>6,7 | 3,7 | 3,4<br>7,8 | 4,8 |
| 5 | 5,6 | 6 | 6,7 | 7 | 7,8 | 8 |
| 5,9 | 5,6<br>9,10 | 6,10 | 6,7<br>10,11 | 7,11 | 7,8<br>11,12 | 8,12 |
| 9 | 9,10 | 10 | 10,11 | 11 | 11,12 | 12 |
| 9,13 | 9,10<br>13,14 | 10,14 | 10,11<br>14,15 | 11,15 | 11,12<br>15,16 | 12,16 |
| 13 | 13,14 | 14 | 14,15 | 15 | 15,16 | 16 |

350, 356, 352, 354, 308

FIG.10
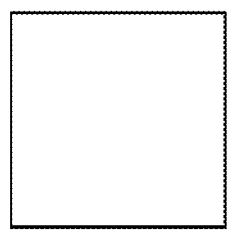
(a)
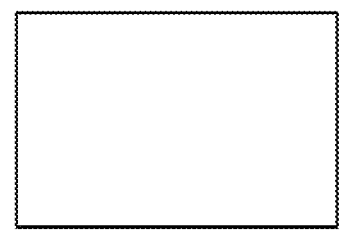
(b)
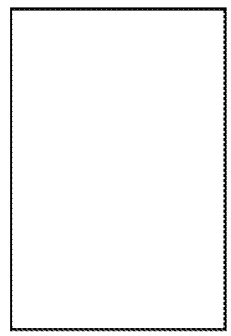
(c)
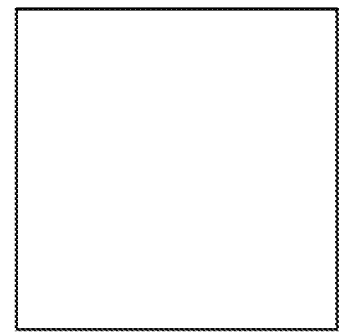
(d)

FIG. 11

| 1 | 1,2 | 2 | 2,3 | 3 | 3,4 | 4 |
|---|-----|---|-----|---|-----|---|
| 1,5 | 1,2<br>5,6 | 2,6 | 2,3<br>6,7 | 3,7 | 3,4<br>7,8 | 4,8 |
| 5 | 5,6 | 6 | 6,7 | 7 | 7,8 | 8 |
| 5,9 | 5,6<br>9,10 | 6,10 | 6,7<br>10,11 | 7,11 | 7,8<br>11,12 | 8,12 |
| 9 | 9,10 | 10 | 10,11 | 11 | 11,12 | 12 |
| 9,13 | 9,10<br>13,14 | 10,14 | 10,11<br>14,15 | 11,15 | 11,12<br>15,16 | 12,16 |
| 13 | 13,14 | 14 | 14,15 | 15 | 15,16 | 16 |

FIG.21
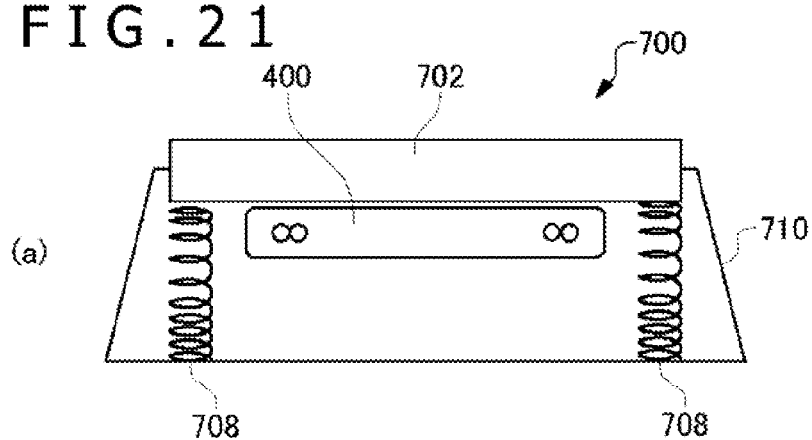
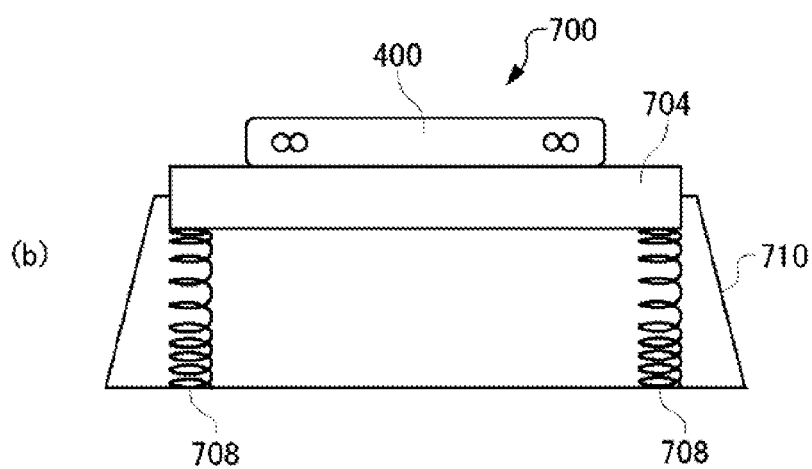
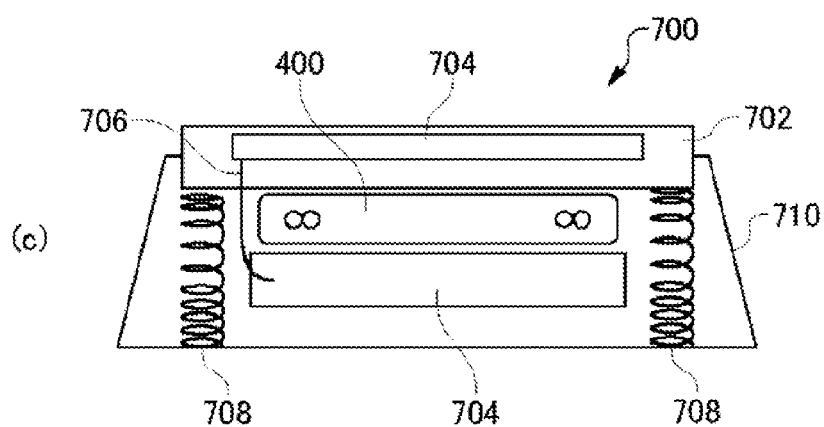

READER FOR RFID TAG FOR NEAR-FIELD WIRELESS COMMUNICATION AND NEAR-FIELD WIRELESS COMMUNICATION SYSTEM

TECHNICAL FIELD

The present invention relates to a reader for an RFID (Radio Frequency IDentification) tag for near-field wireless communication and a near-field wireless communication system.

BACKGROUND ART

In recent years, technologies for near-field wireless communication have developed rapidly, and contactless information communication technologies have become used widely in ticket gates of railway stations, settlement in stores, entering and leaving management or locking for buildings and so forth.

CITATION LIST

Patent Literature

[PTL 1] Japanese Patent Laid-Open No. 2010-156796

SUMMARY

Technical Problem

In near-field wireless communication, a reader for reading information of an RFID tag exchanges information with an RFID tag existing within a communication range thereof. Therefore, where the communication range within which a reader for an RFID tag can read information of an RFID tag is wider, the convenience in use of the reader for an RFID tag when information of an RFID tag is read is better.

The inventor of the present application came to recognize the possibility that, if not only the range within which communication with an RFID tag is possible is increased but also the position of a tag existing in the range is recognized, then it may become possible to provide a new application which utilizes near-field wireless communication.

The present invention has been made in view of such a problem as just described above, and it is an object of the present invention to provide a technology which can increase the range within which communication is possible in near-field wireless communication and by which the position of a tag existing in the range is detected.

Solution to Problem

In order to solve the problem described above, a reader for an RFID tag for near-field wireless communication according to a certain mode of the present invention includes a transmission and reception unit which transmits a carrier wave to the RFID tag and receives a carrier wave transmitted from the RFID tag. The transmission and reception unit includes a modulation part which generates a carrier wave modulated with data to be transmitted to the RFID tag, and an antenna selection switch in which a plurality of antennae transmitting and receiving data to and from the RFID tag arranged with an extent within a predetermined range and which selects one antenna to be used for transmission and reception of data from among the plurality of antennae. The reader for an RFID tag further includes an antenna changeover controlling part which changes over the antenna to be selected by the antenna selection switch, and a detection part which acquires, when the carrier wave transmitted from the RFID tag is received by any of the plurality of antennae, information indicative of the antenna selected by the antenna selection switch under a control of the antenna changeover controlling part.

Another mode of the present invention is a near-field wireless communication system. The near-field wireless communication system includes one or more RFID tags for near-field wireless communication, a reader for an RFID tag for near-field wireless communication, software controlling the reader for an RFID tag, and an information processing apparatus which couples for communication with the reader for an RFID tag and executes the software. The reader for an RFID tag includes a transmission and reception unit which transmits a carrier wave to the RFID tag or tags and receives a carrier wave transmitted from the RFID tag or tags. The transmission and reception unit includes a modulation part which generates a carrier wave modulated with data to be transmitted to the RFID tag or tags, and an antenna selection switch in which a plurality of antennae transmitting and receiving data to and from the one or more RFID tags arranged with an extent within a predetermined range and which selects one antenna to be used for transmission and reception of data from among the plurality of antennae. The reader for an RFID tag further includes an antenna changeover controlling part which changes over an antenna to be selected by the antenna selection switch, and a tag detection part which acquires, when the carrier wave transmitted from any of the one or more RFID tags is received by one of the plurality of antennae, information indicative of the antenna selected by the antenna selection switch under a control of the antenna changeover controlling part, and then detects existing positions of the RFID tags which transmit the carrier wave. The software controls the antenna changeover controlling part to cause the information processing apparatus to implement a function for setting a changeover pattern defining timings of changeover of the antenna to be selected by the antenna selection switch.

It is to be noted that also arbitrary combinations of the components described above and those obtained by conversion of representations of the present invention between a method, an apparatus, a system, a computer program, a data structure, a recording medium and so forth are effective as modes of the present invention.

Advantageous Effect of Invention

With the present invention, it is possible to provide a technology which increases the range within which communication is possible in near-field wireless communication and detects the position of a tag existing in the range.

BRIEF DESCRIPTION OF DRAWINGS

FIG. 9 is a view schematically depicting an example of arrangement of a coil antenna provided in an antenna according to a modification to the embodiment.

FIGS. 10(a) to 10(d) are views schematically depicting four coil antennae having different sizes from one another.

FIG. 11 is a view schematically depicting an example of arrangement of coil antenna where coil antennae having different sizes are used.

FIGS. 12(a) to 12(d) are views illustrating examples of arrangement of coil antennae according to a third modification.

FIGS. 21(a) to 21(c) are views depicting different examples of an application which utilizes a touch sensor.

DESCRIPTION OF EMBODIMENTS

An outline of an embodiment of the present invention is described. A near-field wireless communication system according to the embodiment of the present invention includes a plurality of antennae for communicating with an RFID tag and communicates with an RFID tag while the antenna is changed over between the antennae. The near-field wireless communication system detects the existing position of the RFID tag from the position of that one of the plurality of antennae which communicates with the RFID tag.

Figure 1:
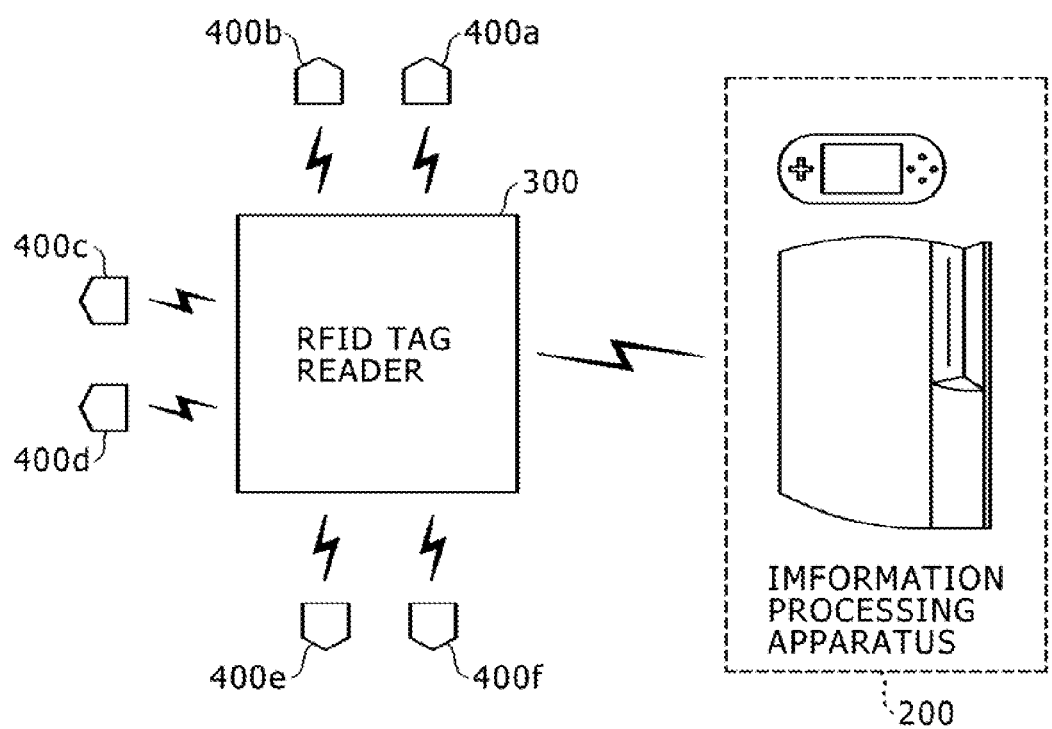
FIG. 1 is a view schematically depicting a general configuration of a near-field wireless communication system according to an embodiment.

FIG. 1 is a view schematically depicting a general configuration of a near-field wireless communication system 100 according to the embodiment. The near-field wireless communication system 100 according to the embodiment includes an information processing apparatus 200, a reader 300 for an RFID tag for near-field wireless communication, and one or more RFID tags 400 for near-field wireless communication. For simplified description, the "reader 300 for an RFID tag for near-field wireless communication" and the "RFID tag 400 for near-field wireless communication" are hereinafter referred to as "reader 300 for an RFID tag" and "RFID tag 400," respectively.

The information processing apparatus 200 is coupled for communication with the reader 300 for an RFID tag. This can be implemented utilizing wire connection, for example, by a known USB (Universal Serial Bus) cable or the like or a wireless connection technology by Bluetooth (registered trademark) or the like. The information processing apparatus 200 includes a CPU (Central Processing Unit), a memory and so forth not depicted, and executes application software utilizing information of an RFID tag 400 acquired from the reader 300 for an RFID tag or controls part of functions of the reader 300 for an RFID tag. As an example of the information processing apparatus 200, for example, a PC (Personal Computer) or a game machine of the installed type for home use, or a portable electronic apparatus such as a portable game machine, a smartphone or a tablet PC, an arcade game machine for business use, a wearable computer including a display device of the eyeglass type which can display a virtual image in an overlapping relationship with an image of the real world or the like is applicable.

In the example depicted in FIG. 1, six RFID tags 400 denoted by reference symbols 400a to 400f are depicted. However, the number of RFID tags 400 is not limited to six, but may be greater or smaller than six. Unless there is no necessity to specifically distinguish the RFID tags 400, each of the RFID tags 400 is hereinafter referred to as RFID tag 400.

Figure 2:
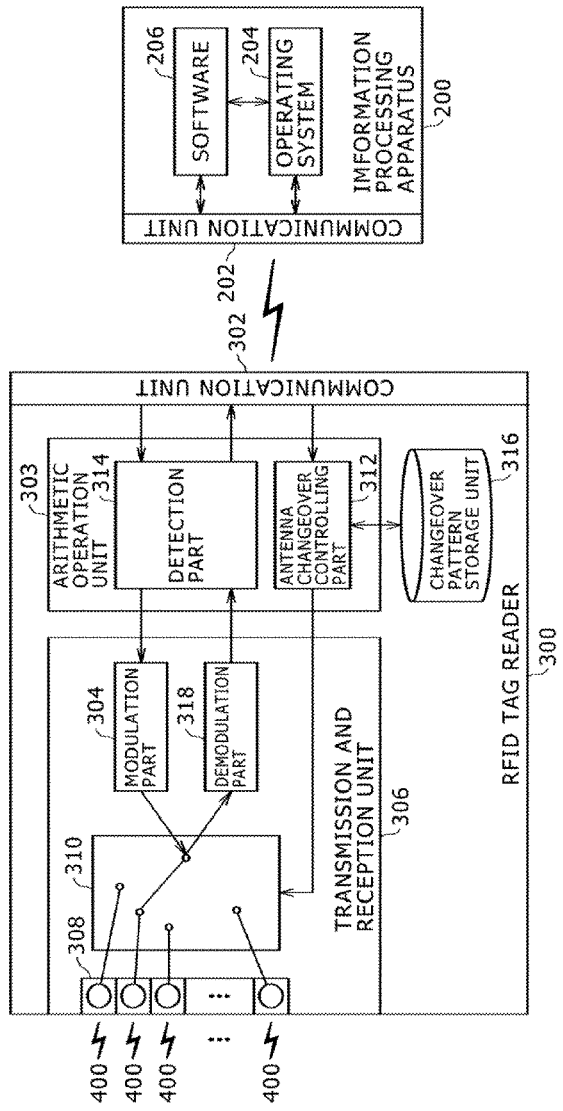
FIG. 2 is a view schematically depicting a functional configuration of an information processing apparatus and a reader for an RFID tag according to the embodiment.

FIG. 2 is a view schematically depicting a functional configuration of the information processing apparatus 200 and the reader 300 for an RFID tag according to the embodiment. The information processing apparatus 200 includes a communication unit 202 for communicating with the reader 300 for an RFID tag and executes software 206 under the control of an operating system 204 which totally controls the information processing apparatus 200.

The reader 300 for an RFID tag includes a communication unit 302, an arithmetic operation unit 303, a transmission and reception unit 306, and a changeover pattern storage unit 316. FIG. 2 depicts a functional configuration for implementing the information processing apparatus 200 and the reader 300 for an RFID tag according to the embodiment but omits the other components. The components described as functional blocks for carrying out various processes are configured, in hardware, from a CPU, a main memory and some other LSI (Large Scale Integration) and can be implemented, in software, a program and so forth loaded in the main memory. Accordingly, it is recognized by those skilled in the art that the functional blocks can be implemented in various forms only from hardware, only from software or from a combination of hardware and software but are not limited to any one of them.

The arithmetic operation unit 303 includes a detection part 314 and an antenna changeover controlling part 312. The arithmetic operation unit 303 is implemented using a known microcomputer and executes processing of data to be transmitted to an RFID tag 400 or data received from an RFID tag 400. The detection part 314 and the antenna changeover controlling part 312 in the arithmetic operation unit 303 are hereinafter described.

The transmission and reception unit 306 performs transmission and reception of information to and from an RFID tag 400. In order to implement this, the transmission and reception unit 306 according to the embodiment includes a modulation part 304, a demodulation part 318, an antenna 308, and an antenna selection switch 310.

The modulation part 304 acquires data to be transmitted to an RFID tag from the arithmetic operation unit 303 and modulates a carrier wave to be used for communication with an RFID tag 400 with the acquired data. The demodulation part 318 demodulates data superimposed on a carrier wave received from the RFID tag 400.

The following description is given assuming that the modulation part 304 according to the embodiment generates a carrier wave in compliance with the communication standard for NFC (Near Field Communication). To this end, the antenna 308 and the RFID tag 400 transmit and receive a carrier wave of a frequency (13.56 MHz) complying with the communication standard for NFC utilizing electromagnetic induction. However, it is apparent to those skilled in the art that the present invention is realized also where the transmission and reception comply with a communication standard different from the communication standard for NFC.

Although a single reference symbol 308 is used in FIG. 2, the transmission and reception unit 306 according to the embodiment includes a plurality of coil antennae. Each coil antenna is arranged with a spread within a predetermined range and has a communication range within which it can communicate with an RFID tag.

Figure 3:
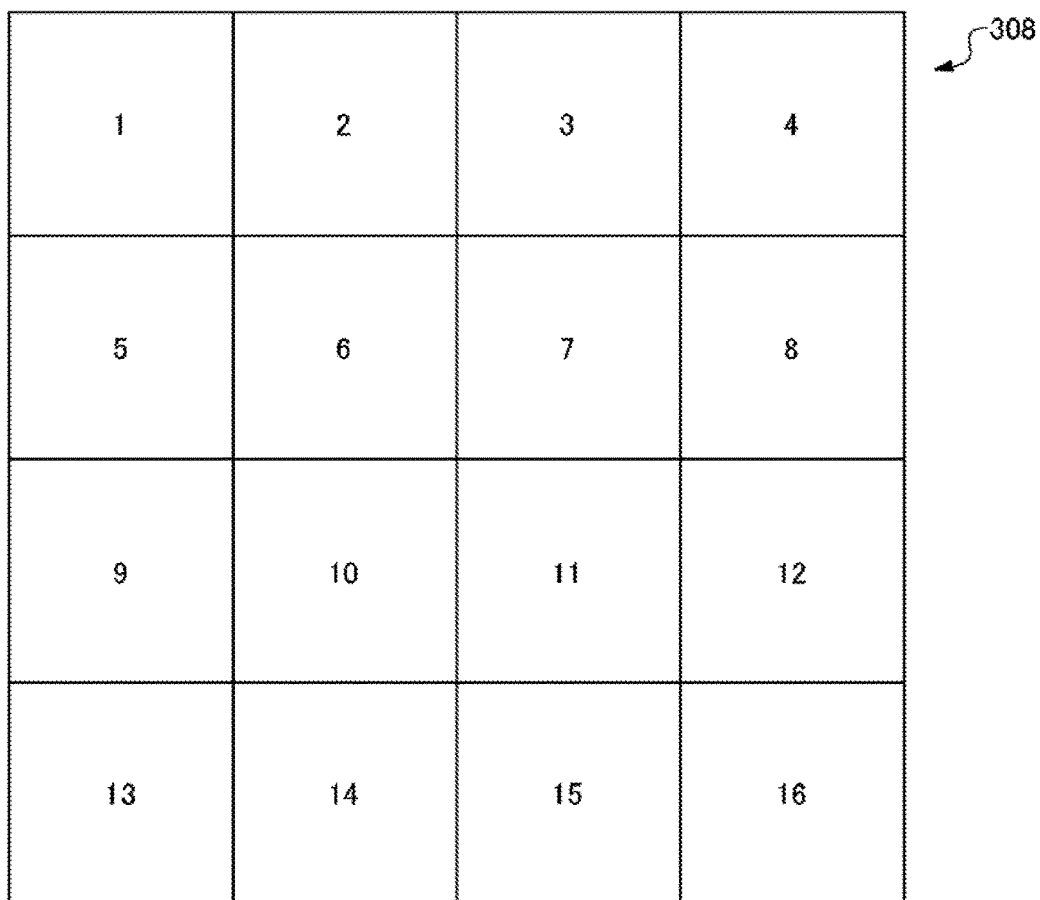
FIG. 3 is a view schematically depicting an example of arrangement of a coil antenna provided in an antenna according to the embodiment.

FIG. 3 is a view schematically depicting an example of arrangement of coil antennae provided in the antenna 308 according to the embodiment. FIG. 3 depicts an example in a case in which the transmission and reception unit 306 includes 16 coil antennae and each coil antenna has a rectangular shape. Generally, where a coil antenna has a rectangular shape, also the shape of a communication range within which it can communicate with an RFID tag 400 is an almost rectangular shape. In the arrangement example of the antenna 308 depicted in FIG. 3, rectangular regions to which serial numbers from 1 to 16 are assigned individually indicate communication ranges of the 16 coil antennae. In the following description, the coil antennae corresponding to the rectangular regions to which the reference numbers from 1 to 16 are assigned are sometimes referred to individually as coil antenna 1 to coil antenna 16.

In the example depicted in FIG. 3, the communication ranges of the coil antennae have a similar extent thereamong and besides are juxtaposed without a clearance therebetween such that the communication ranges of the coil antennae do not overlap with each other. As a result, the transmission and reception unit 306 has a communication range of an extent equal to 16 times in comparison with that where a single coil antenna is used.

In order to communicate with an RFID tag 400 as described above, the reader 300 for an RFID tag requires power for modulating and demodulating a carrier wave. Here, where the reader 300 for an RFID tag is, for example, wire-connected to the information processing apparatus 200 by a USB cable and receives power supplied from the information processing apparatus 200, the reader 300 for an RFID tag can receive sufficient power supply. However, where the reader 300 for an RFID tag and the information processing apparatus 200 communicate wirelessly, the reader 300 for an RFID tag is driven by a battery. Alternatively, where the information processing apparatus 200 itself is driven by a battery, even if the reader 300 for an RFID tag and the information processing apparatus 200 are wire-connected to each other, the entire system is driven by the battery.

However, in order for a plurality of coil antennae to simultaneously communicate with an RFID tag 400, a number of modulation parts 304 and demodulation parts 318 equal to the number of the coil antennae to be used for simultaneous communication are required, and the cost is required as much.

Therefore, the reader 300 for an RFID tag according to the embodiment includes the antenna selection switch 310 for selecting, from among a plurality of coil antennae which the antenna 308 has, one antenna to be used for transmission and reception of data to and from the RFID tag reader. Further, the antenna changeover controlling part 312 controls changeover of the antenna to be selected by the antenna selection switch 310. The antenna selection switch 310 can be implemented using, for example, a known high frequency switching device.

Here, the antenna changeover controlling part 312 changes over the coil antenna to be selected by the antenna selection switch in accordance with a changeover pattern which defines timings for changeover of the coil antenna to be selected by the antenna selection switch 310. The changeover pattern of the coil antenna is stored in the changeover pattern storage unit 316. An example of the changeover pattern defined by the changeover pattern is a scan pattern which defines that a plurality of coil antennae are successively changed over thereamong and selected at predetermined time intervals. When the changeover of the coil antenna complies with the scan pattern, the antenna changeover controlling part 312 controls the antenna selection switch 310 such that the coil antenna to communicate with an RFID tag 400 is changed over cyclically from the coil antenna 1 to the coil antenna 16 in the arrangement example depicted in FIG. 3.

Another example of the changeover pattern defined by the changeover pattern is a subset selection pattern which defines that subsets configured from some coil antennae from among a plurality of coil antennae are successively changed over thereamong and selected. In the arrangement example depicted in FIG. 3, a "subset configured from coil antennae" is a coil antenna group which is configured, for example, from the coil antennae 1, 2, 5, 6, 9, 10, 13 and 14 and covers the left half area of the entire communication range. Where the changeover of the coil antenna complies with the subset selection pattern, the antenna changeover controlling part 312 controls the antenna selection switch 310 such that the coil antenna to communicate with an RFID tag 400 is changed over cyclically in the order of the coil antenna 1, 2, 5, 6, 9, 10, 13 and 14.

In this manner, the antenna changeover controlling part 312 controls the antenna selection switch 310 such that the coil antenna to communicate with an RFID tag 400 is change over time-divisionally. Consequently, the number of coil antennae to communication with an RFID tag 400 always is one at every instant, and also the number of modulation parts 304 and demodulation parts 318 to be used for modulation and demodulation of a carrier wave may individually be only one. While the entire communication range of the transmission and reception unit 306 within which the transmission and reception unit 306 can communicate with an RFID tag 400 is expanded, suppression of power consumption, reduction in cost and reduction in weight of the reader 300 for an RFID tag can be implemented.

Incidentally, by control of the antenna selection switch 310 by the antenna changeover controlling part 312 described above, the communication range with an RFID tag 400 can be expanded. Here, not only if the communication range with an RFID tag 400 is expanded but also if it is possible to detect at which position within the communication range an RFID tag exists, then it becomes possible to utilize the information by application software executed by the information processing apparatus 200 or the like.

To this end, the detection part 314 acquires, when a carrier wave transmitted from an RFID tag 400 is received by one of a plurality of coil antennae, information representative of the coil antenna selected by the antenna selection switch 310 under the control of the antenna changeover controlling part 312. Here, the "information representative of the coil antenna" is an identifier allocated uniquely to each coil antenna in order to identify the coil antenna, and is, for example, one of the serial numbers described hereinabove with reference to FIG. 3.

The detection part 314 specifies the existing position of an RFID tag 400 within the transmission range in which a plurality of coil antennae are arranged using the serial number of the coil antenna selected by the antenna selection switch 310 under the control of the antenna changeover controlling part 312. In particular, the detection part 314 retains, in a storage unit thereof not depicted, such an arrangement map of the coil antennae as depicted in FIG. 3 and acquires the position of the coil antenna corresponding to the serial number acquired from the antenna changeover controlling part 312 in the arrangement map. For example, where the serial number acquired from the antenna changeover controlling part 312 is 4, the detection part 314 determines that an RFID tag 400 exists at a right upper position of the arrangement map of the coil antennae. In this manner, the position of an RFID tag can be detected on the basis of the position of the coil antenna communicating with the RFID tag 400.

Figure 4:
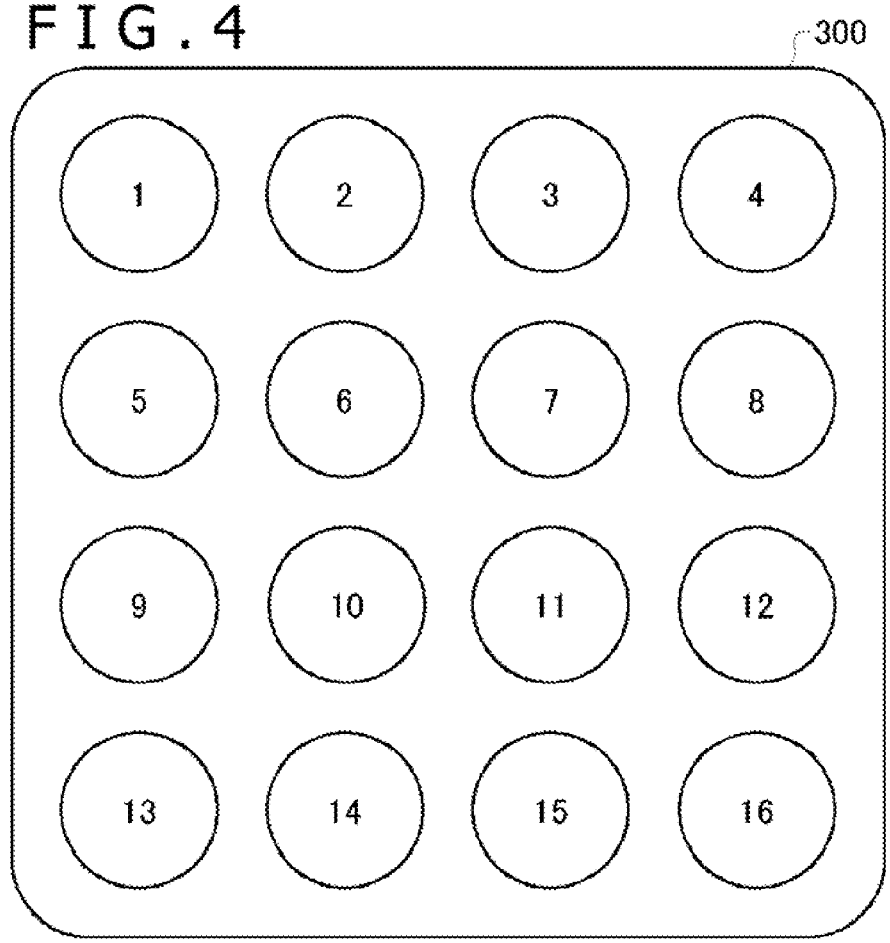
FIG. 4 is a view depicting a top face of a housing in which the reader for an RFID tag according to the embodiment is housed.

FIG. 4 is a view depicting a top face of a housing in which the reader 300 for an RFID tag according to the embodiment is housed and is a view when the top face of the housing of the reader 300 for an RFID tag is viewed from above. In the example depicted in FIG. 4, a plurality of coil antennae included in the antenna 308 are arranged on the top face of the housing of the reader 300 for an RFID tag. In FIG. 4, the coil antennae are arranged in circular regions to which serial numbers from 1 to 16 are assigned. In other words, the circular regions to which the serial numbers from 1 to 16 in FIG. 4 are assigned correspond to the rectangular regions to which the serial numbers from 1 to 16 are assigned in FIG. 3. If an RFID tag 400 is placed on the top face of the housing of the reader 300 for an RFID tag, then the coil antenna having the communication range which includes the place can communicate with the RFID tag 400.

Now, an example of an application in which position detection of an RFID tag 400 by the detection part 314 is utilized is described.

Figure 5:
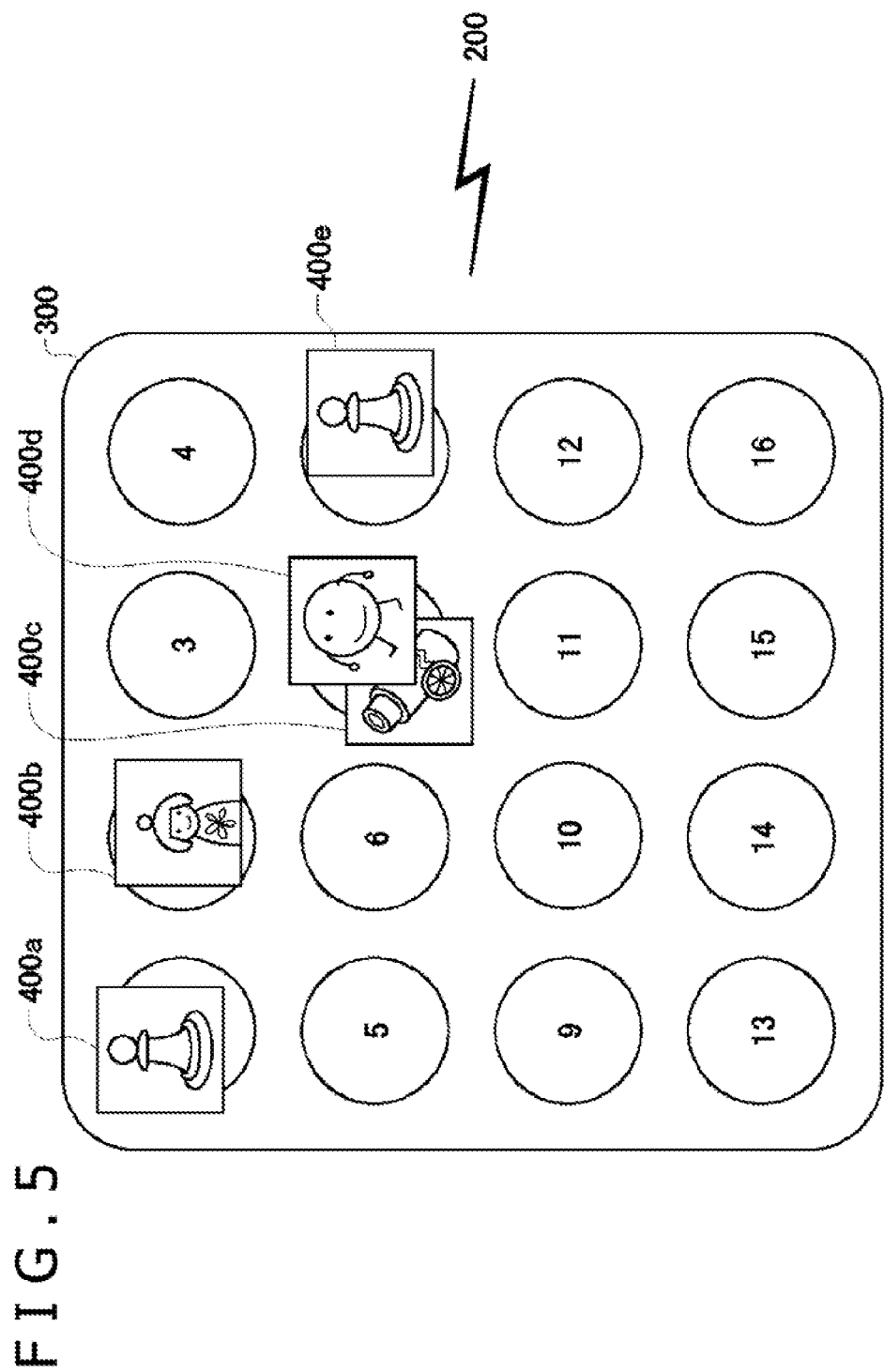
FIG. 5 is a view illustrating a manner in which a plurality of RFID tags are arranged on the reader for an RFID tag according to the embodiment.

FIG. 5 is a view illustrating a manner in which a plurality of RFID tags 400 are arranged on the reader 300 for an RFID tag according to the embodiment. In FIG. 5, five RFID tags 400 from RFID tags 400a to 400e are placed on the top face of the housing of the reader 300 for an RFID tag. The RFID tags 400a to 400e are built in pieces of a card shape on which pictures are individually set forth. However, each RFID tag 400 need not necessarily be built in a card but may be able to have various other forms such that, for example, it is installed on a base of a figure or is installed in a chess piece in Japanese chess.

In the example depicted in FIG. 5, the RFID tag 400a is placed in the circular region 1 in FIG. 4; the RFID tag 400b in the circular region 2 in FIG. 4; the RFID tags 400c and 400d are placed in the circular region 7 in FIG. 4; and the RFID tag 400e is placed in the circular region 8 in FIG. 4. Here, it is assumed that the antenna changeover controlling part 312 controls the antenna selection switch 310 such that the coil antenna to communicate with an RFID tag 400 is changed over cyclically beginning with the coil antenna 1 corresponding to the circular region 1 and ending with the coil antenna 16 corresponding to the circular region 16 in accordance with the scan pattern. At this time, the coil antennae 1, 2, 7 and 8 receive a carrier wave from the RFID tags 400.

In the circular region 7, the RFID tag 400d is placed in an overlapping relationship on the RFID tag 400c. However, since the coil antennae according to the embodiment transmit and receive a carrier wave in compliance with the communication standard for NFC, the coil antenna 7 can communicate with both of the RFID tag 400c and the RFID tag 400d, which are placed in an overlapping relationship with each other, independently of each other. From the carrier waves received from the RFID tags 400 by the coil antennae 1, 2, 7 and 8, data (hereinafter referred to sometimes simply as "data of an RFID tag 400") are separated by the demodulation part 318. The separated data are outputted to the information processing apparatus 200 through the communication unit 302 together with position information acquired by the detection part 314 (hereinafter referred to sometimes simply as "position information of an RFID tag 400").

In the embodiment, the software 206 executed by the information processing apparatus 200 is application software which utilizes the data of the RFID tags 400 acquired from the reader 300 for an RFID tag and position information of the RFID tags 400, and is, as an example, game application software.

Figure 6:
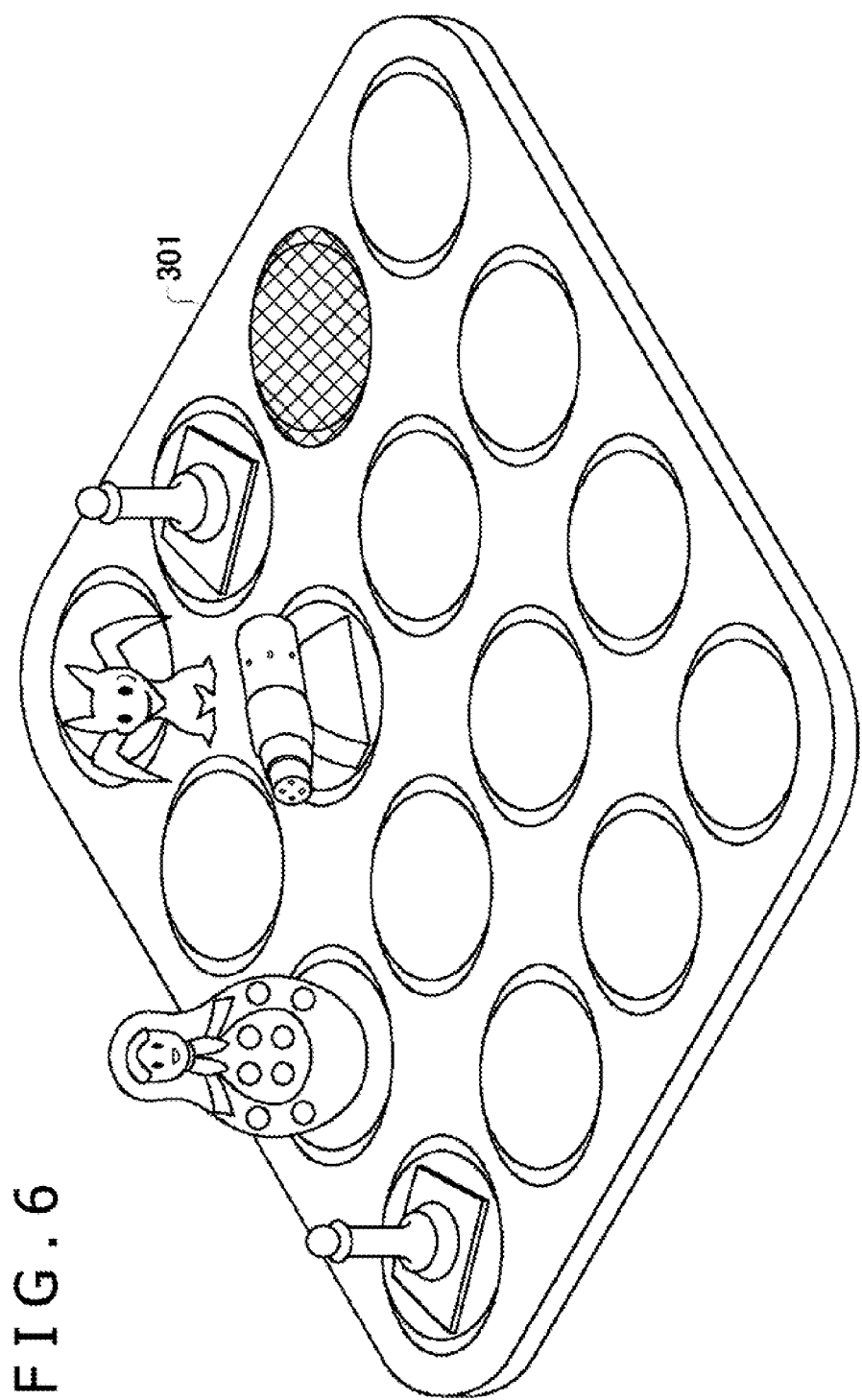
FIG. 6 is a view schematically depicting an example of a game screen image generated by software executed by the information processing apparatus according to the embodiment.

FIG. 6 is a view schematically depicting an example of a game screen image generated by the software 206 executed by the information processing apparatus 200 according to the embodiment and depicts a screen image generated by processing of the software 206 executed by the information processing apparatus 200 on the basis of the data and the position information of the five RFID tags 400 depicted in FIG. 5. In the following description, for example, that "the software 206 executed by the information processing apparatus 200 processes to generate" is described merely in a simplified form as "the software 206 generates" for simplified description. It is to be noted that a game screen image generated by the software 206 is displayed on a display unit (not depicted) provided in the information processing apparatus 200 or connected to the information processing apparatus 200.

In FIG. 6, a flat plate denoted by reference numeral 301 is a virtual game board generated in a virtual three-dimensional space by the software 206 and is an image corresponding to the top face of the reader 300 for an RFID tag. FIG. 6 is a view exemplifying a screen image of a game assuming a competitive board game such as a chess or a Japanese chess. A user would play moving an RFID tag 400, so to speak, as a "piece."

Data of an RFID tag 400 acquired by the software 206 include also an ID (IDentifier) for specifying the type of the RFID tag 400. The software 206 generates an image suitable for the type of the RFID tag 400 on the basis of the ID and displays the generated image at the existing position of the RFID tag 400 on a virtual game board 301.

It is to be noted that the virtual game board 301 is a video generated by the software 206. The software 206 need not necessarily generate a video mimicking the top face of the actually existing reader 300 for an RFID tag, but may generate a game screen image freely setting a stage such as, for example, a sandy beach, a meadow, the lunar surface or a submarine cave. Further, the reader 300 for an RFID tag communicates with the RFID tag 400 in a contactless fashion using an electromagnetic field. Therefore, communication is maintained even if a sheet on which a picture is set forth is arranged on the top face of the reader 300 for an RFID tag. At this time, by providing an RFID tag 400 also on the sheet arranged on the top face, the software 206 can generate also a game screen image of a picture similar to that of the sheet.

More particularly, the type of the RFID tag 400a in FIG. 5 is a pawn of the chess, and the RFID tag 400a is placed in the circular region 1. Therefore, the software 206 generates a video of a pawn at a position of the virtual game board 301 depicted in FIG. 6 which corresponds to the circular region 1. Also the RFID tag 400e in FIG. 5 is a pawn of the chess similarly to the RFID tag 400a, and therefore, the software 206 generates a video of a pawn at a position of the virtual game board 301 depicted in FIG. 6 which corresponds to the circular region 8.

Here, in the circular region 7 in FIG. 5, the RFID tag 400d which indicates a "person" is placed in an overlapping relationship on the RFID tag 400c which indicates the "artillery." Therefore, the software 206 generates a video of the "person" on the "artillery" at a position of the virtual game board 301 depicted in FIG. 6 which corresponds to the circular region 7. In this manner, when one coil antenna receives data from a plurality of RFID tags 400 at the same time, the software 206 may generate a different video in comparison with an alternative case in which data are received independently of each other from a plurality of RFID tags 400. This makes it possible to achieve a direction for raising the game performance such as, for example, a direction that a character is equipped with an item or a magic or another direction that two items are synthesized or merged to generate a new item.

Figure 7:
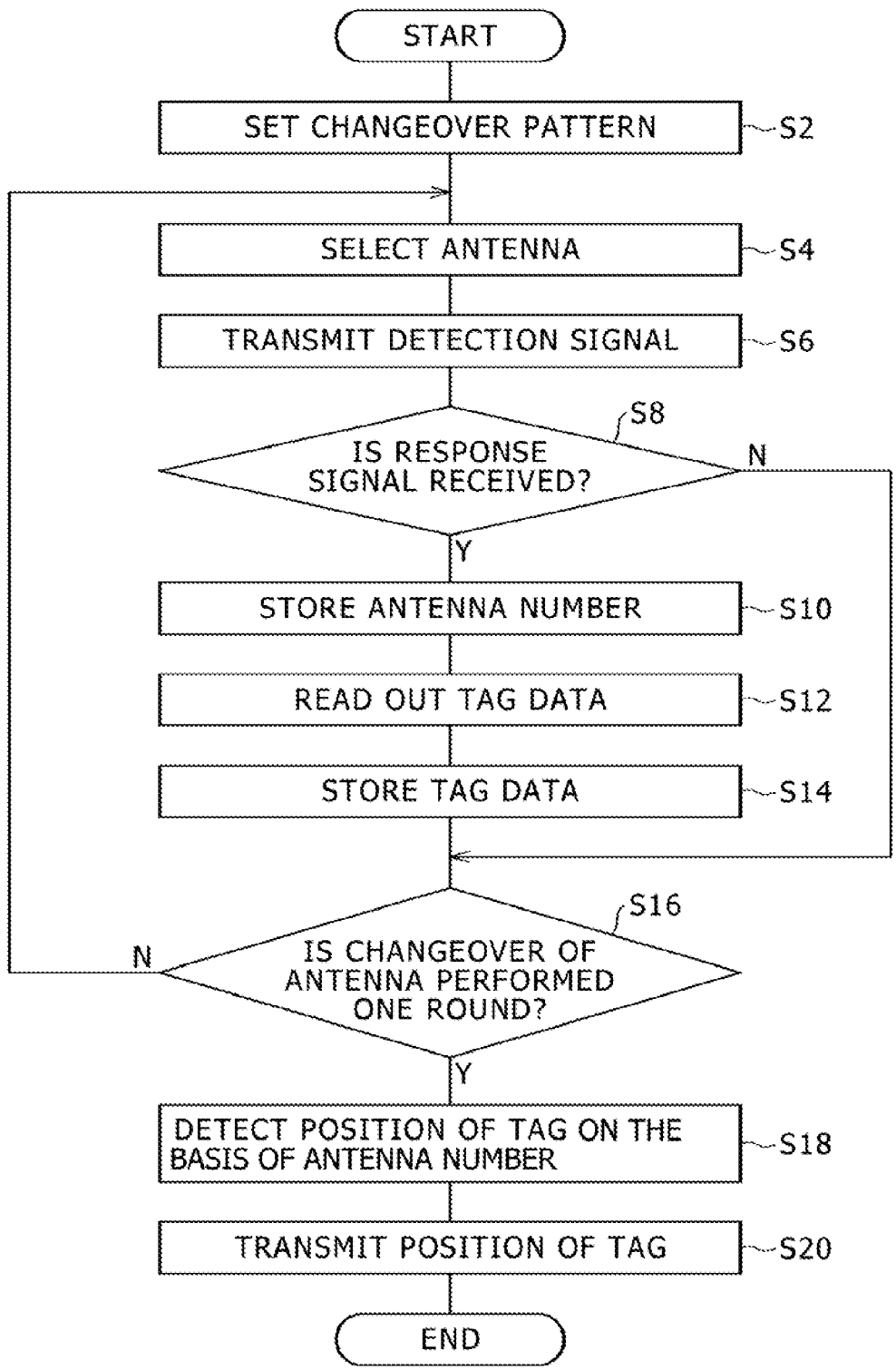
FIG. 7 is a flow chart illustrating a flow of an antenna changeover process executed by the reader for an RFID tag according to the embodiment.

FIG. 7 is a flow chart illustrating a flow of an antenna changeover process executed by the reader 300 for an RFID tag according to the embodiment. Processing of the present flow chart is started, for example, when the power supply to the reader 300 for an RFID tag is turned on.

The antenna changeover controlling part 312 acquires and sets a changeover pattern which defines changeover timings of the coil antenna from the changeover pattern storage unit (S2). The antenna selection switch 310 selects, from among the plurality of coil antennae, one coil antenna to be used for transmission and reception of data to and from the RFID tag reader under the control of the antenna changeover controlling part 312 (S4).

The modulation part 304 modulates a carrier wave with a detection signal for use for detection of a coil antenna generated by the detection part 314 and causes the selected coil antenna to transmit the carrier wave (S6). An RFID tag 400 receiving the detection signal transmits a response signal for the notification of the existence thereof. When the selected coil antenna receives the response signal transmitted from the RFID tag 400 (Y at S8), the detection part 314 stores the antenna number for identifying the coil antenna by which the carrier wave is received into an antenna number temporary storage unit not depicted in the detection part 314 (S10). Further, the detection part 314 transmits, on the basis of the response signal, a reading signal for unique data to the RFID tag 400 from which the response signal has been transmitted and reads out the unique data written in the RFID tag 400 (S12). The detection part 314 stores the read out data of the RFID tag 400 into a temporary storage unit (S14). If the selected coil antenna does not receive the carrier wave transmitted from the RFID tag 400 (N at S8), then the process for storing an antenna number is skipped.

It is to be noted that the detection signal for use for detection of a coil antenna is, for example, an REQA command prescribed by ISO14443-A, and the response signal is, for example, an ATQA response prescribed by ISO14443-A.

Within a period of time until selection of the coil antennae to be selected which are defined by the changeover pattern is performed one round (N at S16), the processes at steps S4 to S14 are repeated to continue the process for storing an antenna number for identifying a coil antenna which receives a carrier wave and data of the RFID tag 400. If selection of the coil antennae to be selected which are defined by the changeover pattern is performed one round (Y at S16), then the detection part 314 detects the position of the RFID tags 400 on the basis of the temporarily stored antenna numbers (S18). The detection part 314 causes the communication unit 302 to transmit the data of the RFID tags 400 including the data representative of the detected positions of the RFID tags 400 (S20).

After the communication unit 302 transmits the data to the information processing apparatus 200, the processing by the present flow chart is ended. The RFID tag 400 repeats the processes described above to continue the position detection of the RFID tags 400.

Here, as described hereinabove, the user would move an RFID tag 400 as a piece in the example of the game depicted in FIG. 6. At this time, for example, if the user picks up an RFID tag 400 and moves the RFID tag 400 to the outside of the communication range of the coil antenna, then the software 206 can determine from a change of the position information of the RFID tag 400 which one of the RFID tags 400 the user wants to move.

However, even before the user actually moves the RFID tag 400, if, at a point of time at which the user touches with the RFID tag 400, such touch can be detected, then the software 206 can use the detection result to perform a new direction. In particular, when data representing that the user touches with the RFID tag 400 is acquired, the software 206 can perform such a direction that a corresponding video is moved up away from the virtual game board 301, that a video which is moved in an oscillating manner is generated or the like.

Figure 8:
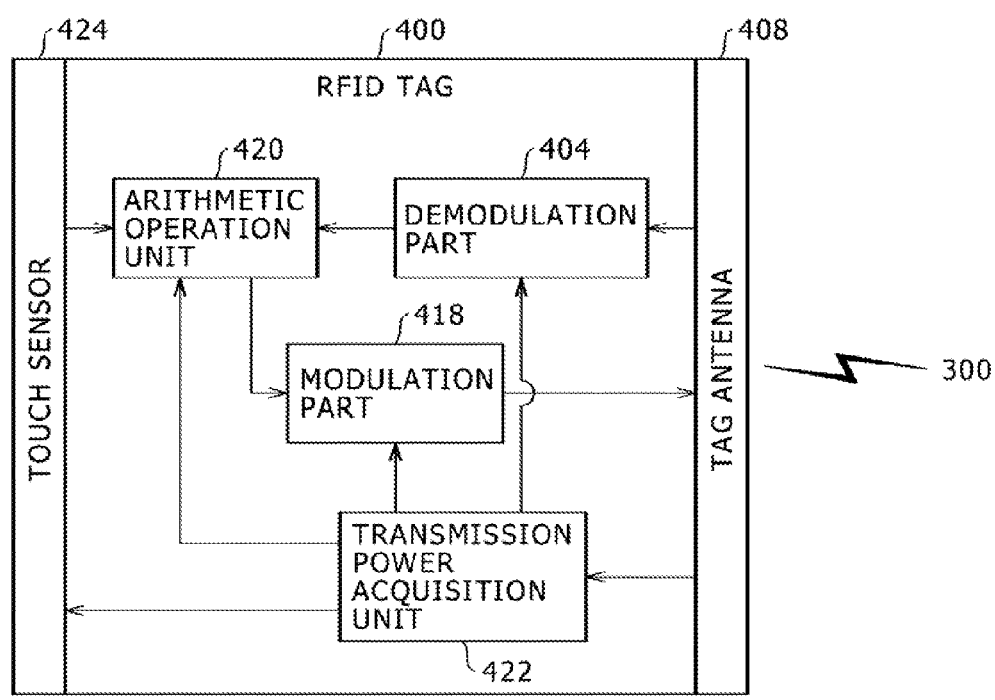
FIG. 8 is a view schematically depicting a functional configuration of the RFID tag according to the embodiment.

FIG. 8 is a view schematically depicting a functional configuration of each RFID tag 400 according to the embodiment. The RFID tag 400 according to the embodiment includes a demodulation part 404, a tag antenna 408, a modulation part 418, an arithmetic operation unit 420, a transmission power acquisition unit 422 and a touch sensor 424.

The transmission power acquisition unit 422 acquires transmission power sent from the reader 300 for an RFID tag through the tag antenna 408. Although the transmission power sent from the reader 300 for an RFID tag generally is alternating current (AC) power, the components of the RFID tag 400 operate with direct current (DC) power. Therefore, the transmission power acquisition unit 422 is implemented by a known technology such as a rectification circuit which converts AC power into DC power or a voltage-limiting circuit which prevents application of an excessively high voltage. The components of the RFID tag 400 operate with power acquired by the transmission power acquisition unit 212. It is to be noted that, though not depicted, where the RFID tag 400 is a so-called active tag which includes a power supply such as a battery, the components of the RFID tag 400 may be driven by the power of the power supply.

The tag antenna 408 receives a carrier wave transmitted from an antenna 308 in the reader 300 for an RFID tag and transmits a carrier wave to the reader 300 for an RFID tag. The touch sensor 424 detects a touch of an RFID tag by a user. The touch sensor 424 can be implemented using a known detection technology such as a resistance film method or an electrostatic capacity type.

If the touch sensor 424 detects a touch, then the arithmetic operation unit 420 converts information representative of the detection into data. The modulation part 418 generates a carrier wave modulated with the data generated by the arithmetic operation unit 420 or data representative of a type of an RFID tag 400 in order to transmit the carrier wave to the reader 300 for an RFID tag through the tag antenna 408. The tag antenna 408 transmits the carrier wave generated by the arithmetic operation unit 420 to the reader 300 for an RFID tag. Consequently, the software 206 can acquire the information detected by the touch sensor of the RFID tags 400 through the reader 300 for an RFID tag, and can apply a direction to a video at a point of time at which the user touches with the RFID tag 400.

In the description given above, application software of a game assuming a board game is taken as an example of the software 206 which utilizes data of the RFID tags 400 and the position information of the RFID tags 400. The game application which may be implemented by the software 206 is not limited to a board game but may be assumed to be such a game as a so-called "whack-a-mole game" as another example.

If the near-field wireless communication system 100 according to the embodiment is used, then the whack-a-mole game can be implemented, for example, in such a mode as described below. First, a tool which imitates a hammer is prepared for whacking a mole, and an RFID tag 400 is installed at a location of the head of the hammer or parts of the hammer. The software 206 generates an image corresponding to the top face of the reader 300 for an RFID tag and causes the display unit to display the image similarly as in FIG. 6. In this image, the position corresponding to each of the circular regions is a hole from which a "mole" comes out.

The software 206 further generates an image corresponding to a "mole" periodically or at random in addition to the image corresponding to the top face and causes the display unit to display the images. The user would observe the display unit and strikes at a circular region of the top plate of the reader 300 for an RFID tag corresponding to the position at which the "mole" appears using the tool simulating the hammer. If the user strikes the top plate of the reader 300 for an RFID tag, then since the distance between the reader 300 for an RFID tag and the RFID tag 400 installed in the tool comes near to a distance within which communication is possible, the software 206 can know the timing at which the user strikes the top plate. The software 206 compares the timing at which the "mole" is displayed and the timing at which the user strikes the top plate with each other to determine whether or not the user is successful in whacking of a mole.

Here, if the "whack-a-mole game" and the "board game" described hereinabove are compared with each other, then the antenna changeover controlling part 312 sets the changeover period of the coil antenna shorter when the "whack-a-mole game" is to be executed than when the "board game" is to be executed. In particular, it is considered that, in the "board game," a period of several tens of seconds to more than one minute is required to move an RFID tag 400 from such a reason that the user thinks out a destination of movement of a piece or the like. Accordingly, the antenna changeover controlling part 312 may change over the coil antenna in such a period that the coil antennae are successively selected one round in one second.

On the other hand, in the "whack-a-mole game," it is necessary for the coil antennae to be selected one round at least in a period substantially equal to a frequency in which a "mole" is displayed. Even if the appearance frequency of a "mole" is once per one second to several seconds, since the 16 coil antennae are involved, it is preferable for the antenna changeover controlling part 312 to select the coil antennae one round in several tens to several hundreds of milliseconds.

Therefore, the antenna changeover controlling part 312 in the embodiment is configured such that it receives an instruction from the information processing apparatus 200 which executes the software 206 and can change the changeover pattern through the communication unit 302. As a particular example, when the antenna changeover controlling part 312 sets, for example, the scan pattern described hereinabove as the changeover pattern, it changes the time interval after which the coil antenna is to be changed over in accordance with an instruction from the software 206. As another example, when the antenna changeover controlling part 312 has a subset selection pattern described hereinabove set therein, it changes the coil antennae which configure the subset in accordance with an instruction from the software 206.

In this manner, by changing the changeover pattern in accordance with a command from the outside, the antenna changeover controlling part 312 can flexibly cope with specifications required by an application which is executed by the near-field wireless communication system 100.

As described above, with the near-field wireless communication system 100 according to the embodiment, it is possible to provide a technology which increases the range within which communication is possible upon near-field wireless communication and detects the position of a tag existing within the range.

The present invention has been described on the basis of the embodiment. The embodiment is exemplary, and it is recognized by those skilled in the art that various modifications are possible to the combination of the components and the processes of the embodiment and that also such modifications remain within the scope of the present invention.

First Modification

The above-described example depicted in FIG. 3 is directed to a case in which the communication ranges of the coil antennae have a similar extent and are arranged without a clearance therebetween such that they do not overlap with each other. The arrangement method of the coil antennae is not limited to this. In the following, different examples of arrangement of coil antennae are described as modifications.

FIG. 9 is a view schematically depicting an example of arrangement of coil antennae provided in the antenna 308 according to a modification to the embodiment. In the example depicted in FIG. 9, the shape and the size of six coil antennae are similar to the shape and the size of the coil antennae in the example depicted in FIG. 3. However, in the example depicted in FIG. 9, the plurality of coil antennae are arranged such that at least part of them overlap with at least part of one or more ones of the coil antennae. As a result, at least part of the communication ranges of the plurality of coil antennae overlap with at least part of the communication range of one or more other antennae.

Numbers in FIG. 9 correspond to the serial numbers of the coil antennae in FIG. 3. For example, a region 350 in FIG. 9 is part of the communication range of the coil antenna 1. Meanwhile, a region 352 is a region in which the communication ranges of the coil antenna 1 and the coil antenna 2 overlap with each other. Similarly, in a region 354, the communication ranges of the coil antennae 1, 2, 5 and 6 overlap with each other. Overlapping of communication ranges is found similarly in other regions, and the number described in each region in FIG. 9 signifies a serial number of a coil antenna whose communication range is the region.

Here, the communication range of each coil antenna in the example depicted in FIG. 9 and the communication range of each coil antenna in the example depicted in FIG. 3 have an equal extent. Accordingly, the communication range of the coil antenna 1 in FIG. 9 is a region equal to the combined region of the regions indicated by the regions 350, 352, 354 and 356. In the example depicted in FIG. 3, when an RFID tag 400 contacts with the regions indicated by the regions 350, 352, 354 and 356, it is placed into a communicatable state only with the coil antenna 1. On the other hand, in the example depicted in FIG. 9, when an RFID tag 400 contacts with the region 350, it can communicate only with the coil antenna 1. However, if an RFID tag 400 contacts with the region 352, 354 or 356, then it is placed into a communicatable state also with a coil antenna different from the coil antenna 1.

For example, if an RFID tag 400 is communicatable with all of the coil antennae 1, 2, 5 and 6, then the detection part 314 can specify that the RFID tag 400 is positioned in the region 354. By arranging a plurality of coil antennae such that at least part of the communication ranges thereof overlap at least with part of one or more other communication ranges in this manner, the resolution in position detection of an RFID tag 400 by the detection part 314 can be improved. In other words, the resolution in the position detection in the example depicted in FIG. 3 is equivalent to communication range of one coil antenna. Meanwhile, in the example depicted in FIG. 9, although using the coil antenna equal to that in the example depicted in FIG. 3, the resolution in position detection of an RFID tag 400 becomes finer than that of the example depicted in FIG. 3. More particularly, in the example depicted in FIG. 9, 49 positions in 7 rows and 7 columns can be detected using 16 coil antennae equal to those in the example depicted in FIG. 3.

Incidentally, in the example depicted in FIG. 9, a region at an end of the antenna 308 has a greater area in a region thereof for detecting an RFID tag 400 than a region in a central region of the antenna 308. For example, the area of the region 350 is greater than the area of the region 354. Depending upon an application implemented by the software 206, it is sometimes demanded to have a uniform resolution over the overall antenna 308. Therefore, in order to achieve a uniform resolution over the overall antenna 308, coil antennae of different sizes may be used.

FIGS. 10(*a*) to 10(*d*) are views schematically depicting four coil antennae having different sizes from each other. FIG. 10(*d*) depicts a coil antenna having a size same as that of the coil antennae in FIG. 3. FIG. 10(*a*) depicts a coil antenna to be used in place of the coil antennae 1, 4, 13 and 16 in FIG. 3. FIG. 10(*b*) depicts a coil antenna to be used in place of the coil antennae 2, 3, 14 and 15 in FIG. 3. FIG. 10(*c*) depicts a coil antenna to be used in place of the coil antennae 5, 8, 9 and 12 in FIG. 3. For the coil antennae 6, 7, 10 and 11, the coil antenna depicted in FIG. 10(*d*), namely, a coil of a size same as that of the coil antennae in FIG. 3, is used.

FIG. 11 is a view schematically depicting an example of arrangement of coil antennae where coil antennae of different sizes are used, and particularly is a view depicting an example of arrangement of coil antennae where the coil antennae depicted in FIGS. 10(*a*) to 10(*d*) are used. Regions 350', 352', 354' and 356' in FIG. 11 correspond to the regions 350, 352, 354 and 356 in FIG. 9, respectively. The extent of the region 354' in FIG. 11 and the extent of the region 354 in FIG. 9 are substantially equal to each other. Also the extents of the regions 350', 352' and 356' in FIG. 11 are equal to the extent of the region 354 in FIG. 9. Consequently, in the example depicted in FIG. 11, the resolution in position detection of the RFID tags 400 is uniform over the overall antenna 308.

Second Modification

In the foregoing description, a case is described in which a virtual video generated in a virtual three-dimensional space generated by the software 206 executed by the information processing apparatus 200 is displayed on the display unit. However, the presentation method of a virtual video is not limited to this.

In the near-field wireless communication system 100 according to a second modification, the information processing apparatus 200 is a wearable computer including a display device of the eyeglass type (not depicted) which can display a virtual video in an overlapping relationship with a video of the real world. The information processing apparatus 200 can display a video panned by a solid-state image pickup element by executing the software 206. The information processing apparatus 200 can further display a virtual video in an overlapping relationship with the video imaged by the solid-state image pickup element by using a known AR (Augmented Reality) technology.

A user of the near-field wireless communication system 100 according to the second modification would wear the display device of the eyeglass type to observe the reader 300 for an RFID tag. At this time, if an RFID tag 400 exists on the top plate of the reader 300 for an RFID tag, then the software 206 generates a video in response to the RFID tag 400 in order to display the image in an overlapping relationship on the video on the top plate of the reader 300 for an RFID tag existing really. Consequently, the user can enjoy the virtual video overlapping on the reader 300 for an RFID tag, which exists really, together with the reader 300 for an RFID tag. Consequently, the game performance can be raised.

Third Modification

In the examples described hereinabove with reference to FIGS. 9 and 11, it is necessary for one coil antenna to detect nine different tags at the maximum. For example, in the example depicted in FIG. 9, it is necessary for the coil antenna 1 to simultaneously detect tags placed in four regions indicated by the regions 350, 352, 354 and 356. Similarly, for example, in the example depicted in FIG. 11, it is necessary for the coil antenna 11 to simultaneously detect tags placed in nine regions. Further, in the example depicted in FIG. 11, since the coil antennae have different sizes, the process to be executed upon detection of a tag differs among the different coil antennae. Therefore, the RFID tags 400 according to a third modification are configured such that the number of tags to be detected by each coil antenna is reduced and besides the coil antennae have a uniform size.

FIGS. 12(a) to 12(d) are views illustrating examples of arrangement of coil antennae according to the third modification. FIG. 12(a) depicts an antenna configured from 16 coil antennae 1 to 16 of the same shape juxtaposed in 4 rows and 4 columns. FIG. 12(b) depicts an antenna configured from 12 coil antennae (coil antennae a to l) which have a same shape as that of the coil antennae configuring the antenna in FIG. 12(a) and are juxtaposed in 3 rows and 4 columns. Similarly, FIG. 12(c) depicts an antenna configured from 12 coil antennae (coil antennae A to L) which have a same shape as that of the coil antennae configuring the antenna in FIG. 12(a) and are juxtaposed in 4 rows and 3 columns.

FIG. 12(d) is a view schematically depicting an example of arrangement of the antenna 308 according to the third modification. The coil antennae according to the third modification are configured by placing the antennae depicted in FIGS. 12(a) to 12(c) one on another in three layers. More particularly, the coil antennae according to the third modification are configured by placement thereof one on another such that the centers (indicated by a mark "x") of the antennae depicted in FIGS. 12(a) to 12(c) coincide with each other.

The range over which the antenna 308 according to the third modification can detect an RFID tag 400 is same as the range in which the 16 coil antennae are juxtaposed as depicted in FIG. 12(a). Further, 8*8=64 regions depicted in FIG. 12(d) are different in combination of overlapping coil antennae. Accordingly, the resolution of the antenna 308 according to the third modification is improved to 8*8=64 regions depicted in FIG. 12(d). Further, the resolution is uniform over the overall antenna 308 and besides the coil antennae have a uniform size. Further, the maximum number of RFID tags 400 which one coil antenna must detect can be suppressed to four.

Figure 12:
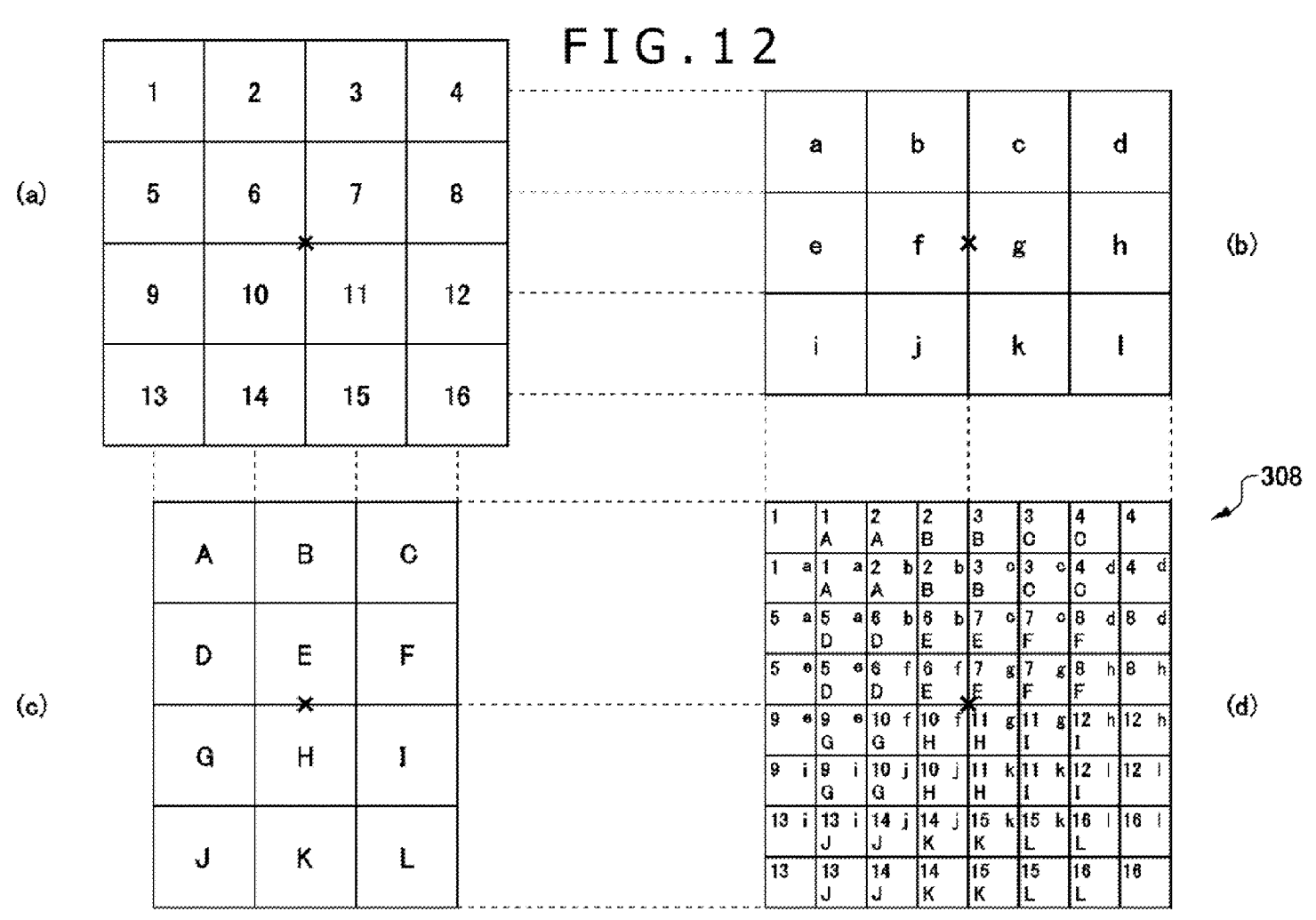

It is to be noted that, while, in FIG. 12, the antenna 308 is depicted which can detect an RFID tag in 64 regions using a combination of totaling 40 antennae depicted in FIGS. 12(a) to 12(c), the number of antennae to be used is not limited to 40. For example, where the antenna 308 which can detect an RFID tag in 4*4=16 regions is configured, only eight coil antennae are required, and in order to configure the antenna 308 which can detect an RFID tag in 10*10 regions, 65 coil antennae are used. Further, the shape of ranges in which the antenna 308 can detect an RFID tag 400 is not limited to a square, but may be a rectangular shape or may be any shape only if the antenna 308 can be configured by a combination of coil antennae.

Fourth Modification

In the foregoing description, a case is described in which the antenna selection switch 310 selects one coil antenna by associating one coil antenna in the antenna 308 and one switch circuit in a one-by-one corresponding relationship with each other and selecting one switch circuit. Here, when one coil antenna is to be selected, it is necessary to select the input side and the output side of the coil antenna. Accordingly, the antenna selection switch 310 described hereinabove requires 2N switch circuits in order to make it possible to select N coil antennae. Therefore, if the number of coil antennae which configure the antenna 308 increases, also the number of switch circuits increases, resulting in increase of the circuit scale and the cost.

Therefore, the antenna selection switch 310 according to a fourth modification includes a first switch circuit 330 and a second switch circuit 332 and specifies one coil antenna on the basis of the combination of a switch selected by the first switch circuit 330 and a switch selected by the second switch circuit. In the following, specification of a coil antenna based on a combination of two switch circuits is described.

Figure 13:
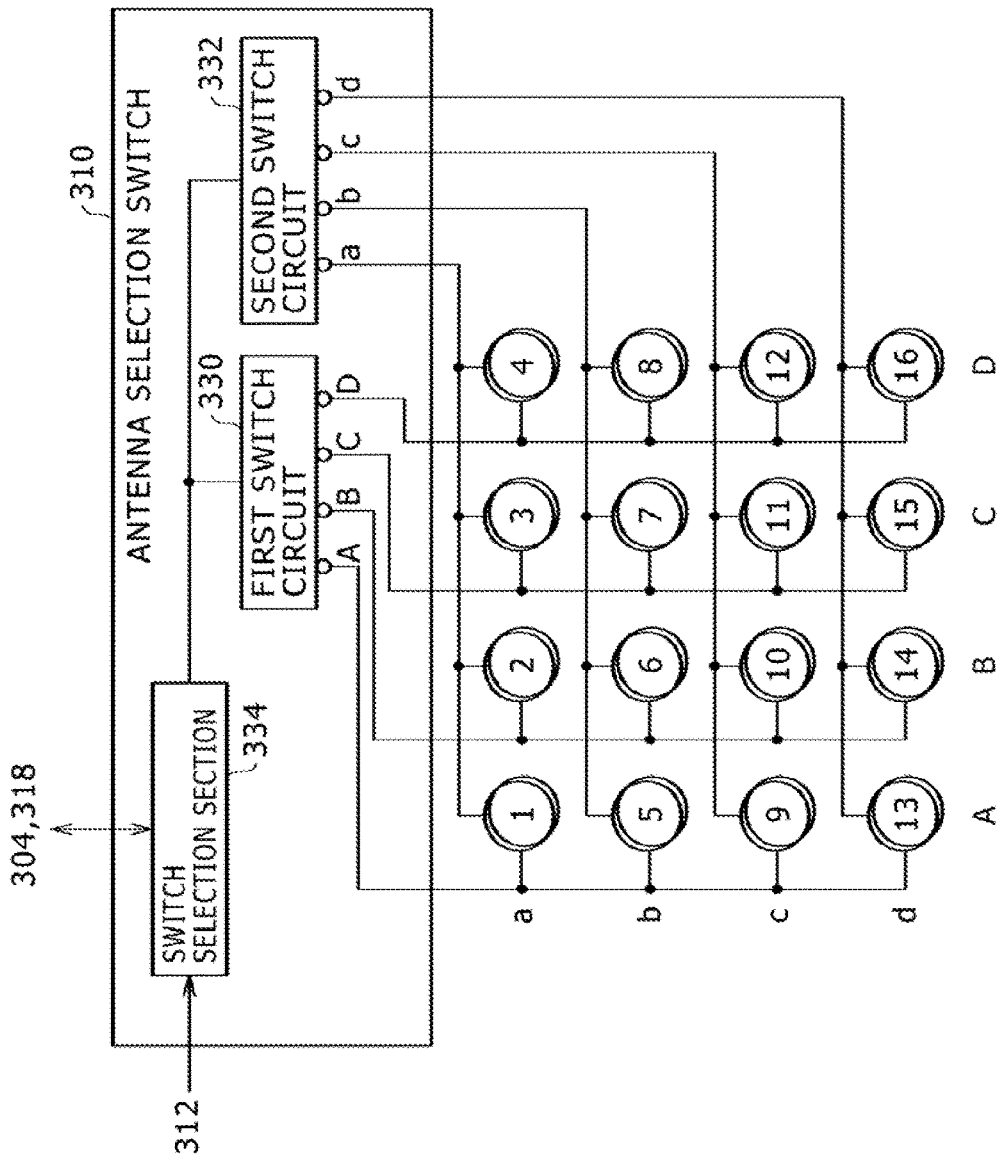
FIG. 13 is a view depicting a comparative example of an antenna selection switch according to a fourth modification.

FIG. 13 is a view depicting a comparative example of the antenna selection switch 310 according to the fourth modification. In FIG. 13, 16 coil antennae arranged in 4 rows and 4 columns are depicted. In the example depicted in FIG. 13, the columns of the coil antennae are represented by four alphabets of capital letters from A to D, and the rows of the coil antennae are represented by four alphabets of small letters from a to d. At this time, the 16 coil antennae depicted in FIG. 13 can be identified each from a combination of an alphabet of a capital letter representing a column and an alphabet of a small letter representing a row. For example, the coil antenna 8 depicted in FIG. 13 can be specified by (D, b).

The first switch circuit 330 includes four terminals A to D and is electrically coupled with the coil antennae so as to select a column of the coil antennae. On the other hand, the second switch circuit 332 includes four terminals a to d and is electrically coupled with the coil antennae so as to select a row of the coil antennae. For example, in order to select the coil antenna 8 depicted in FIG. 13, the first switch circuit 330 may select the terminal D and the second switch circuit 332 may select the terminal b. It is to be noted that a switch selection section 334 changes over the terminals to be selected by the first switch circuit 330 and the second switch circuit 332 under the control of the antenna changeover controlling part 312.

Here, the number of terminals of the first switch circuit 330 is four, and also the number of terminals of the second switch circuit 332 is four. Accordingly, by specifying a coil antenna by the combination of the first switch circuit 330 and the second switch circuit 332 as depicted in FIG. 13, the 16 coil antennae can be specified by 4+4=8 switches.

Generally, when the number of coil antennae which make a target of specification is represented by A, A can be represented as A=m*n using two divisors m and n. Since the number of combinations (i, j) of m+n numerals which satisfy 1≤i≤m and 1≤j≤n is m*n=A, A coil antennae can be allocated uniquely by the combinations (i, j) of the m+n numerals. Further, if the first switch circuit 330 is configured so as to allow selection of m terminals and the second switch circuit 332 is configured so as to allow selection of n terminals, then it is possible to specify the A coil antennae using the m+n switches. It is to be noted that each of the m terminals of the first switch circuit 330 is coupled in parallel to the n coil antennae and besides the combinations of the coil antennae connected to the terminals are mutually exclusive. Similarly, it is to be noted that each of the n terminals of the second switch circuit 332 is coupled in parallel to the m coil antennae and besides the combinations of the coil antennae connected to the terminals are mutually exclusive.

FIG. 13 depicts an example in which A=16 and m=n=4. Here, m=n is not necessarily required, and, for example, m and n may be m=2 and n=8, respectively. In this case, 16 coil antennae can be specified by 2+8=10 switches. It is to be noted that, as the values of m and n come closer to each other, the number of switches required to specify the coil antennae can be reduced. Accordingly, it is preferable to adopt a combination of numerals which minimize |m−n| under the condition of m*n=A. For example, where A=72, preferably (m, n)=(8, 9) or (9, 8).

It is to be noted that the selection of m and n does not rely upon an actual manner of arrangement of a plurality of coil antennae. For example, even in a case in which 72 coil antennae are arranged in a vertically elongated fashion in 18 rows and 4 columns, m and n may be selected so as to satisfy (m, n)=(8, 9) or (9, 8), namely, for example, to configure the first switch circuit 330 so as to select eight terminals and configure the second switch circuit 332 so as to select nine terminals and besides couple the terminals such that each coil antenna can be specified uniquely by a combination of a terminal coupled by the first switch circuit 330 and a terminal coupled by the second switch circuit 332. Further, where one of m and n is 1, the configuration becomes similar to that in a case in which one coil antenna and one switch circuit depicted in FIG. 2 are associated in a one-by-one corresponding relationship with each other.

Incidentally, each coil antenna configuring the antenna 308 has a loop shape and communicates using magnetism induced by current flowing through the loop. Here, a case is considered in which, for example, in the example depicted in FIG. 13, the coil antenna 10 is selected. In particular, this is a case in which the first switch circuit 330 selects the terminal B and the second switch circuit 332 selects the terminal c. At this time, current naturally flows through the coil antenna 10, by which a magnetic field is induced. Consequently, the coil antenna 10 can communicate with an RFID tag 400 positioned in the proximity of the coil antenna 10.

On the other hand, also the current path from the terminal B, which is being selected, of the first switch circuit 330 to the terminal c, which is being selected, of the second switch circuit 332 has a loop shape and can function as an antenna. The loop configured by the current path has a size including the coil antennae 2, 3, 4, 6, 7 and 8. Therefore, in the circuit configuration depicted in FIG. 13, there is the possibility that, if the coil antenna 10 is selected, then not only an RFID tag 400 positioned in the proximity of the coil antenna 10 but also RFID tags 400 positioned in the region including the coil antennae 2, 3, 4, 6, 7 and 8 may be detected.

Therefore, in the antenna selection switch 310 according to the fourth modification, the coupling to the antenna selection switch is performed such that, within a loop configured from the current path from a terminal coupled by the first switch circuit 330 to a terminal coupled by the second switch circuit 332, no any other coil antenna is included.

Figure 14:
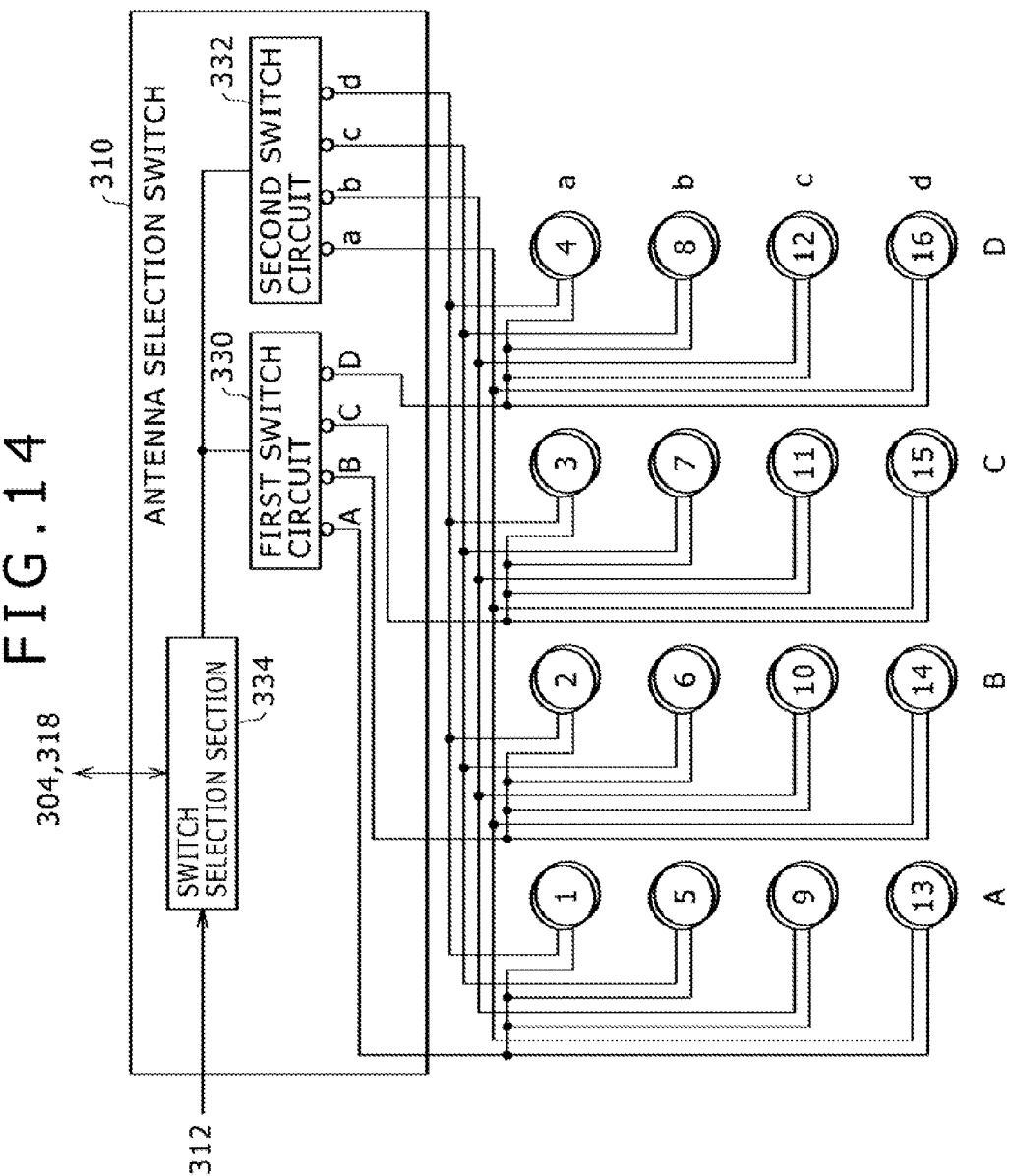
FIG. 14 is a view schematically depicting a configuration of the antenna selection switch according to the fourth modification.

FIG. 14 is a view schematically depicting the antenna selection switch 310 according to the fourth modification. The antenna selection switch 310 according to the fourth modification includes a first switch circuit 330, a second switch circuit 332 and a switch selection section 334, which are similar to the first switch circuit 330, the second switch circuit 332 and the switch selection section 334 depicted in FIG. 13, respectively.

Also the antenna selection switch 310 according to the fourth modification specifies each coil antenna uniquely from a combination of a terminal selected by the first switch circuit 330 and a terminal selected by the second switch circuit 332 similarly to the comparative example of the antenna selection switch 310 depicted in FIG. 13. However, in the antenna selection switch 310 according to the fourth modification, a current path from a terminal being selected by the first switch circuit 330 to a terminal being selected by the second switch circuit 332 is different from that of the comparative example of the antenna selection switch 310 depicted in FIG. 13.

More particularly, as depicted in FIG. 14, in an area in which the coil antennae are arranged, current paths interconnecting the antenna selection switch 310 and input and output terminals of the coil antennae do not share a wiring line therebetween but are connected by wiring lines for exclusive use for the individual coil antennae. By using the wiring lines for exclusive use for the individual coil antennae, two wiring lines for connecting an input terminal and an output terminal of each coil antenna to each other can be disposed in the proximity of each other. As a result, it is possible to exclude other coil antennae from within the loops formed from the wiring lines, and it can be suppressed for those wiring lines to configure pseudo antennae.

Fifth Modification

In the foregoing description, a case is described which the RFID tags 400 include the touch sensor 424. A reader 300 for an RFID tag according to a fifth modification includes a touch sensor in place of or in addition to the configuration just described.

Figure 15:
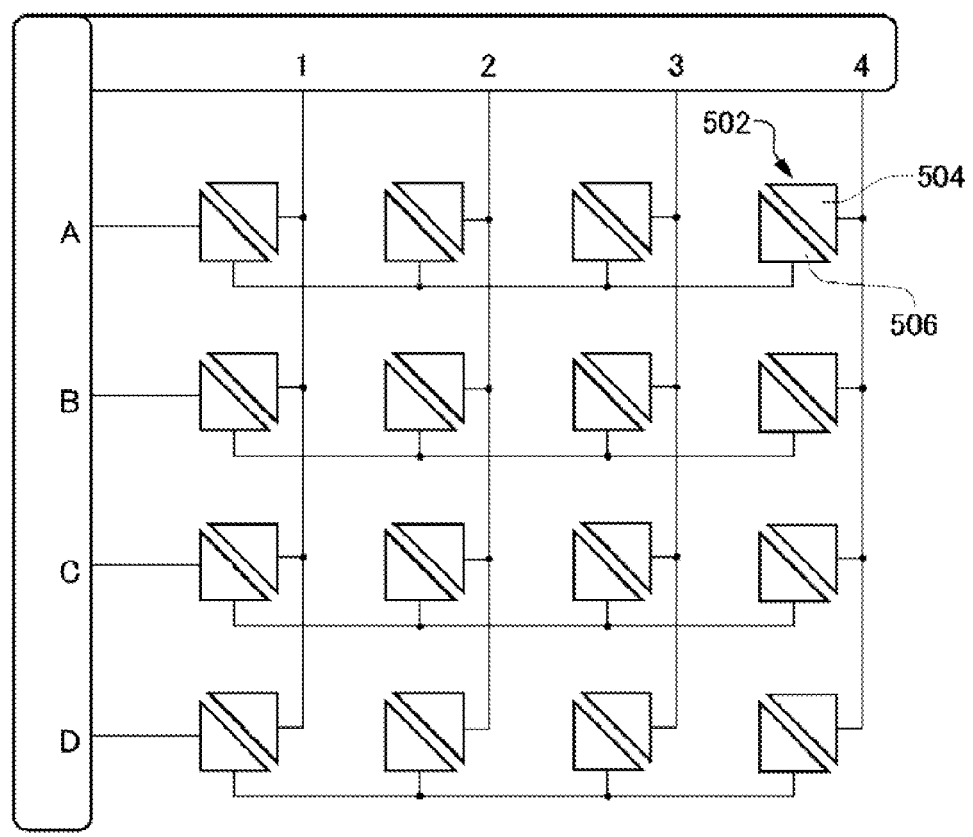
FIG. 15 is a view schematically depicting an example of a touch sensor provided in a reader for an RFID tag according to a fifth modification.

FIG. 15 is a view schematically depicting an example of a touch sensor 500 provided in the reader 300 for an RFID tag according to the fifth modification. In the example depicted in FIG. 15, the touch sensor 500 includes 16 sensor modules 502 arranged in 4 rows and 4 columns. While, in order to prevent complicated description, reference numeral 502 is assigned only to one sensor module in FIG. 15, a plurality of sensor modules are hereinafter referred to each as "sensor module 502" except for a case in which the sensor modules 502 are specifically distinguished from each other.

Each sensor module 502 can be implemented by using, for example, a known electrostatic capacity type sensor. Since the electrostatic capacity sensor is a known technology, detailed description of the sensor is omitted. The sensor module 502 includes a first electrode 504 for detecting a touch position in a vertical direction and a second electrode 506 for detecting a touch position in a horizontal direction. When a finger of a user touches with the surface of the reader 300 for an RFID tag directly or through a conductor, the sensor module 502 detects a variation of the electrostatic capacity between the electrodes and the surface of the reader 300 for an RFID tag to detect the touch position.

In the touch sensor 500 depicted in FIG. 15, the sensor modules 502 are arranged in 4 rows and 4 columns and is used in combination with the antenna 308 in which coil antennae are arranged, for example, in 4 rows and 4 columns as depicted in FIG. 14. While details are hereinafter described, for example, by building a conductor in a detection target (for example, a card, a figure or the like) in which the RFID tag 400 is built, recognition of a type of an object which touches with the surface of the reader 300 for an RFID tag and recognition of whether or not the object actually touches with the surface are made possible. In particular, by communication of the antenna 308 with the RFID tag 400, the type of the RFID tag 400 in the object can be acquired, and the touch sensor 500 can recognize whether or not the detection target actually touches with the surface of the reader 300 for an RFID tag.

Figure 16:
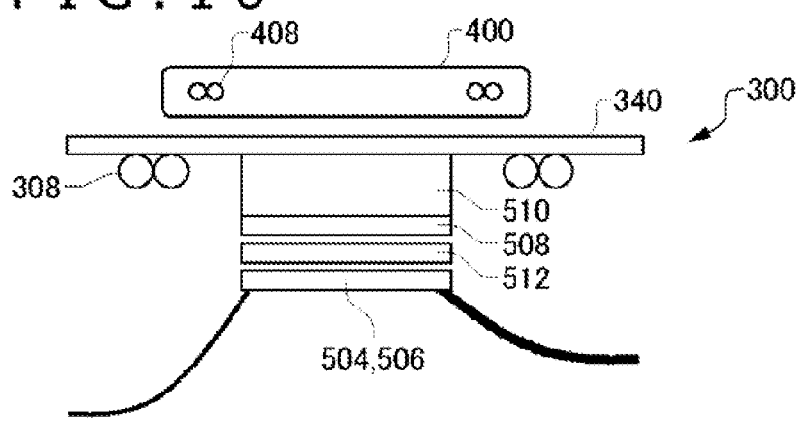
FIG. 16 is a view schematically depicting a cross section of the reader for an RFID tag according to the fifth modification together with a cross section of an RFID tag.

FIG. 16 is a view schematically depicting a cross section of the reader 300 for an RFID tag according to the fifth modification together with a cross section of the RFID tag 400. As depicted in FIG. 16, in the reader 300 for an RFID tag according to the fifth modification, the antenna 308 is arranged in the proximity of the top plate 340 which serves as the surface of the reader 300 for an RFID tag. A first dielectric 510, a conductor 508 and a second dielectric 512 are arranged in a stacked relationship in this order between the first and second electrodes 504 and 506 of the touch sensor 500 and the top plate 340.

Since the touch sensor 500 includes the first electrode 504 and the second electrode 506 as described above, if the touch sensor 500 is arranged between the top plate 340 and the antenna 308, then this makes communication between the antenna 308 and the RFID tag 400 difficult. Therefore, the reader 300 for an RFID tag according to the fifth modification is configured such that the top plate 340, antenna 308 and touch sensor 500 are arranged in this order. Further, in order to provide a distance between the antenna 308 and the touch sensor 500, the first dielectric 510 is inserted between the antenna 308 and the touch sensor 500.

Though not limited, as an example, the top plate 340 has a size of a vertical dimension of approximately 30 cm and a horizontal dimension of approximately 30 cm. In this case, if the sensor modules 502 are uniformly arranged in 4 rows and 4 columns below the top plate 340 as depicted in FIG. 15, then the size of the sensor modules 502 becomes approximately 2 to 3 cm. Consequently, when a finger of the user touches with the top plate 340, there is the possibility that the first electrode 504 and the second electrode 506 may fail to detect the touch at the same time. This is because the size of the first electrode 504 and the second electrode 506 is greater than that of a region over which a finger of the user touches.

Therefore, in the reader 300 for an RFID tag according to the fifth modification, the conductor 508 is arranged between the first dielectric 510 and the first and second electrodes 504 and 506. Consequently, the first and second electrodes 504 and 506 can detect a touch in stability. Further, in order to prevent short-circuiting arising from a touch of the conductor 508 and the first electrode 504 or the second electrode 506 with each other, the second dielectric 512 is provided between the conductor 508 and the first electrode 504 and second electrode 506.

Figure 17:
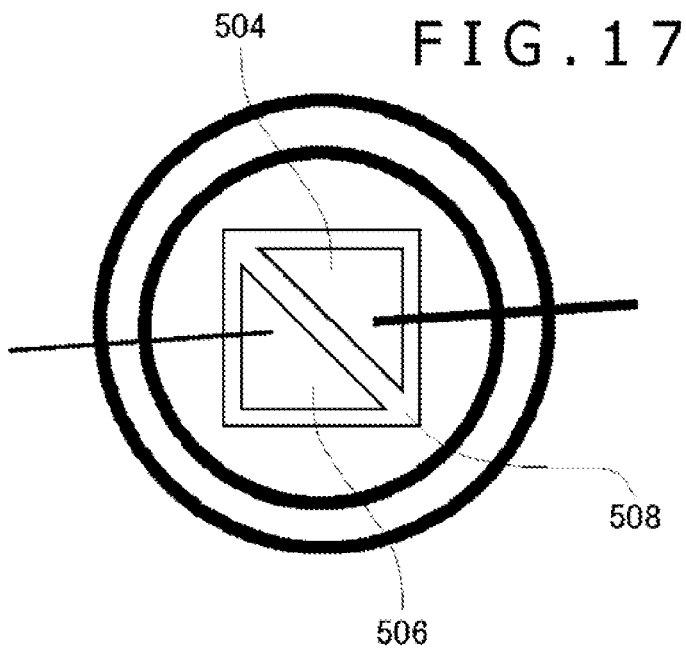
FIG. 17 is a view schematically depicting a relationship in magnitude and position between a coil antenna and a sensor module.

FIG. 17 is a view schematically depicting a relationship of the size and the position between a coil antenna and a sensor module 502. As depicted in FIG. 17, the first electrode 504 and the second electrode 506 of the sensor module 502 are arranged so as to be accommodated in the inside of a circularly-shaped coil antenna. Further, the conductor 508 is arranged so as to cover the first electrode 504 and the second electrode 506.

Figure 18:
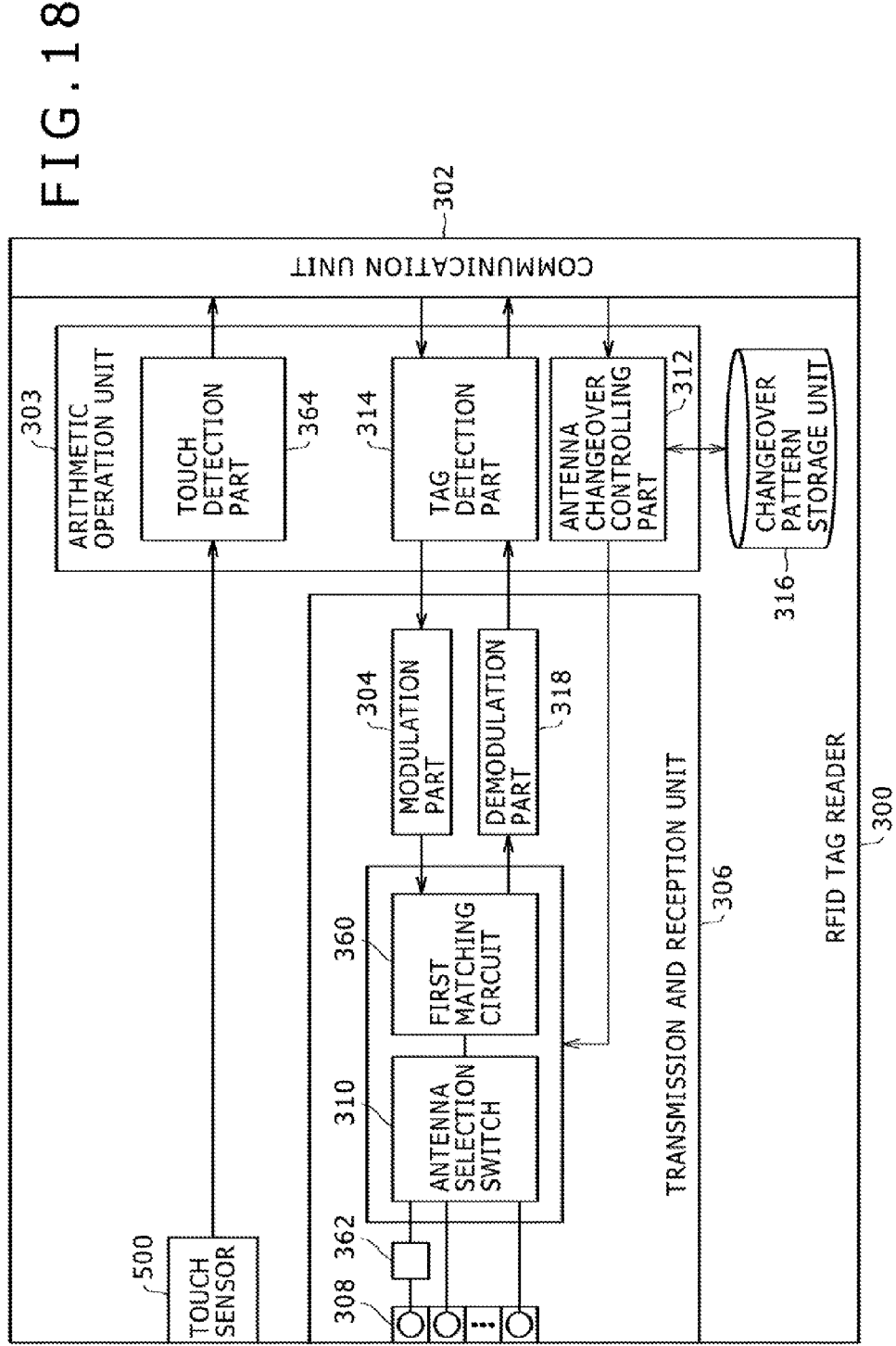
FIG. 18 is a view schematically depicting a functional configuration of the reader for an RFID tag according to the fifth modification.

FIG. 18 is a view schematically depicting a functional configuration of the reader 300 for an RFID tag according to the fifth modification. In comparison with the reader 300 for an RFID tag depicted in FIG. 2, the reader 300 for an RFID tag according to the fifth modification further includes the touch sensor 500, a touch detection part 364, a first matching circuit 360 and a second matching circuit 362. While the other components are similar to those of the reader 300 for an RFID tag depicted in FIG. 2, the detection part 314 in FIG. 2 is referred to as tag detection part 314 in FIG. 18 in order to distinguish the detection part 314 from the touch detection part 364.

The touch detection part 364 detects a touch position on the top plate 340 on the basis of the variation of the electrostatic capacities of the first electrode 504 and the second electrode 506 in each sensor module 502 of the touch sensor 500. The touch position detected by the touch detection part 364 is transmitted to the information processing apparatus 200 through the communication unit 302.

As described above, the reader 300 for an RFID tag includes a plurality of coil antennae and communicates with an RFID tag 400 while the coil antenna is changed over time-divisionally among the coil antennae. To this end, the impedance or the like is matched for each of the coil antennae during communication. In order to implement this, the reader 300 for an RFID tag includes the first matching circuit 360 and the second matching circuit 362. Here, the first matching circuit 360 is coupled with all of the coil antennae and collectively adjusts the performance of the coil antennae. On the other hand, the second matching circuit 362 is coupled only with a specific one of the coil antennae. More particularly, the second matching circuit 362 is coupled with a coil antenna for which adjustment of the performance higher than that by the first matching circuit 360 is required.

As described above, in the reader 300 for an RFID tag according to the fifth modification, the antenna 308 and the touch sensor 500 coexist. Therefore, also a coil antenna whose communication performance with an RFID tag 400 degrades depending upon a positional relationship between the antenna 308 and the touch sensor 500 or the like possibly exists. The second matching circuit 362 is coupled with such a coil antenna whose communication performance is degraded in comparison with that of the other coil antennae as described above.

Figure 19:
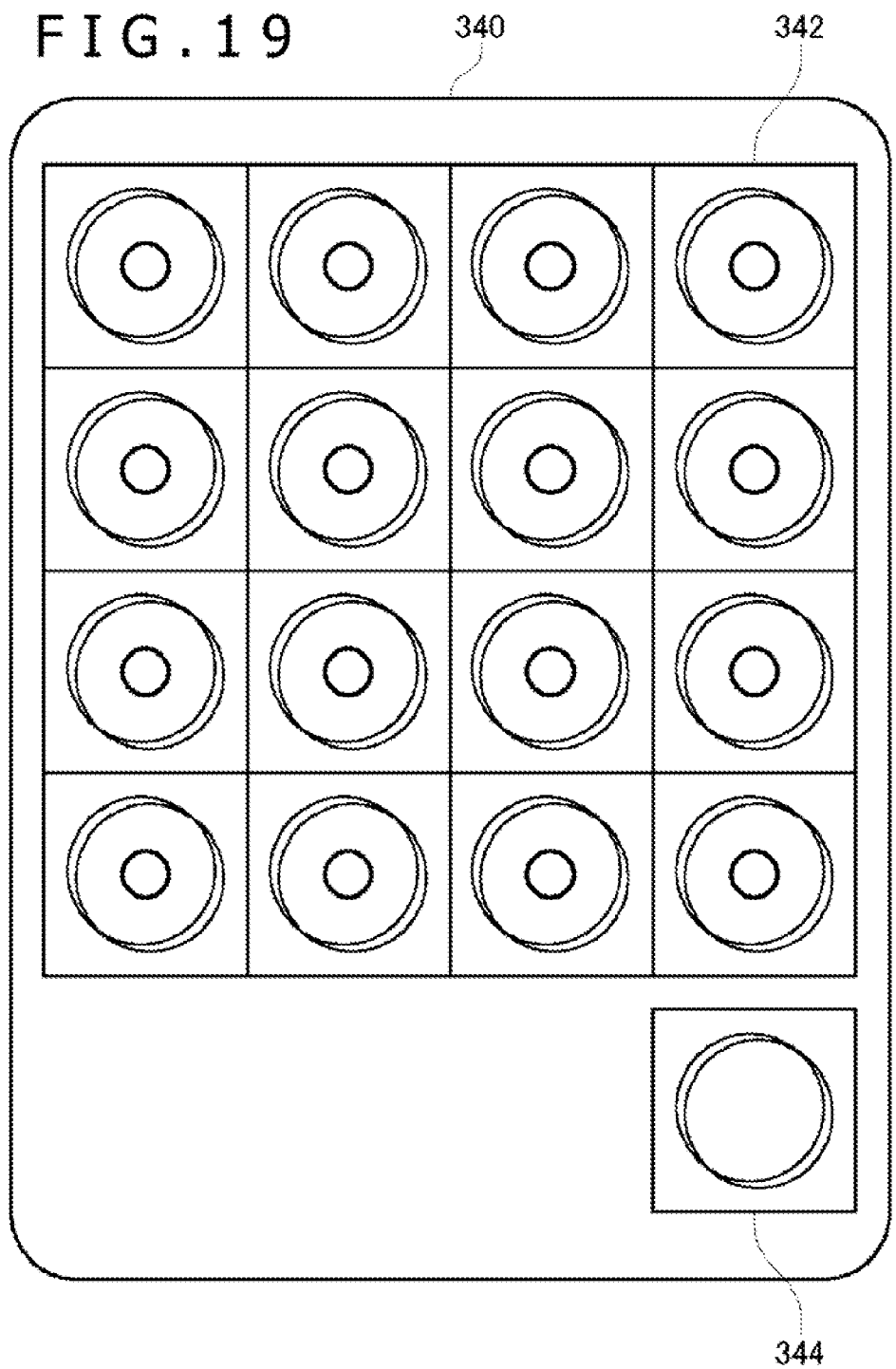
FIG. 19 is a view schematically depicting an example of an appearance of a top plate of the reader for an RFID tag.

FIG. 19 is a view schematically depicting an example of an appearance of the top plate 340 of the reader 300 for an RFID tag. In the example depicted in FIG. 19, an application placement area 342 on which an RFID tag 400 for an application is to be placed and a general-purpose placement area 344 on which a general-purpose RFID tag 400 is to be placed are provided. The antenna 308 described above is placed on the application placement area 342. On the other hand, on the general-purpose placement area 344, a coil antenna for which a communication performance higher than that of the antenna 308 is required is arranged independently.

It is assumed that the coil antenna arranged on the general-purpose placement area 344 communicates with an apparatus such as, for example, an IC card or a portable telephone set ready for the NFC having various antenna sizes or communication performances. Therefore, the touch sensor 500 described above is not arranged in the general-purpose placement area 344, and a higher communication performance is secured by coupling the second matching circuit 362 for exclusive use for the coil antenna with the coil antenna. It is to be noted that, depending upon a kind of an application, the coil antenna is used in a state in which a sheet for exclusive use on which a picture or the like is printed covers the top plate 340. By embedding, when the sheet for exclusive use is placed on the top plate 340, the RFID tag 400 for identifying the sheet at a location of the top plate 340 corresponding to the general-purpose placement area 344, it can be detected whether or not the information processing apparatus 200 is covered with a suitable sheet.

Now, an application which utilizes the touch sensor 500 is described.

The RFID has a communication distance of several mm to several tens mm and recognizes the RFID tag 400 before the RFID tag 400 contacts with the coil antenna. The RFID tag 400 is recognized before the RFID tag 400 actually contacts with the coil antenna or the top plate 340. Since there is a case in which an action type application is desired to decide a touch, the reader 300 for an RFID tag according to the fifth modification utilizes the touch sensor 500 for detection of a touch.

Figure 20:
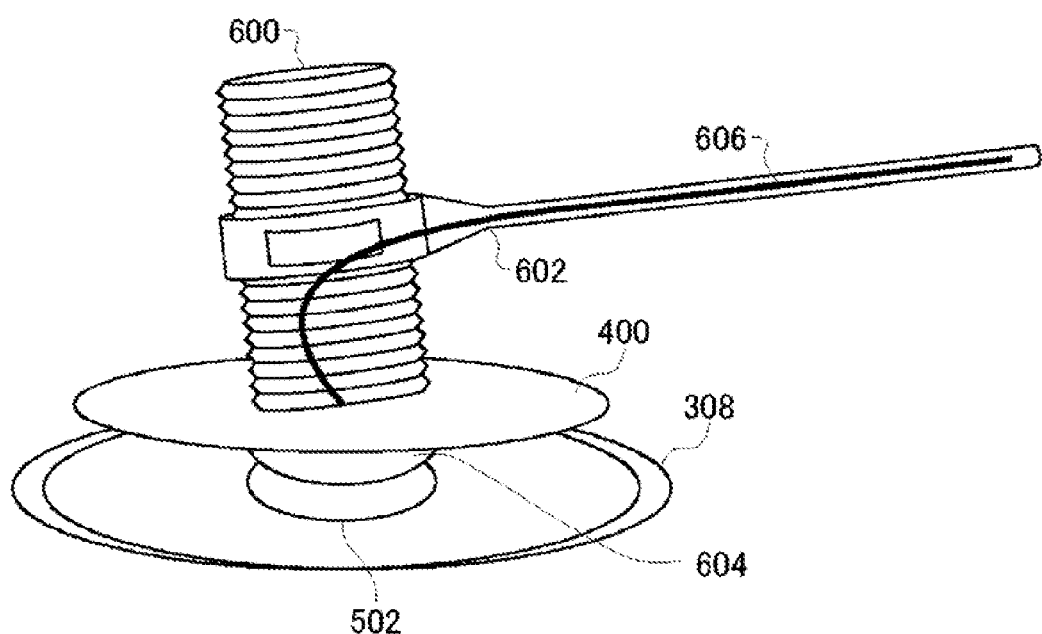
FIG. 20 is a view depicting an example of an application which utilizes a touch sensor.

FIG. 20 is a view depicting an example of an application which utilizes the touch sensor 500. The example depicted in FIG. 20 is a view indicating a tool like a hammer to be used for "whack-a-mole game" described above. The tool includes a hammer portion 600 for knocking a mole and a grip portion 602 for being grasped by the user. Further, the RFID tag 400 and the conductor 604 are attached to the hammer portion 600. The conductor 604 is, for example, electrically conductive rubber.

Here, also the grip portion 602 is configured from a conductor, and the grip portion 602 and the conductor 604 are electrically coupled with each other through a wiring line 606. Therefore, if the user grips the grip portion 602 and knocks the top plate 340 using the hammer portion 600, then the user and the sensor module 502 are electrically coupled with each other, and consequently, the touch sensor 500 can detect a touch.

Figure 22:
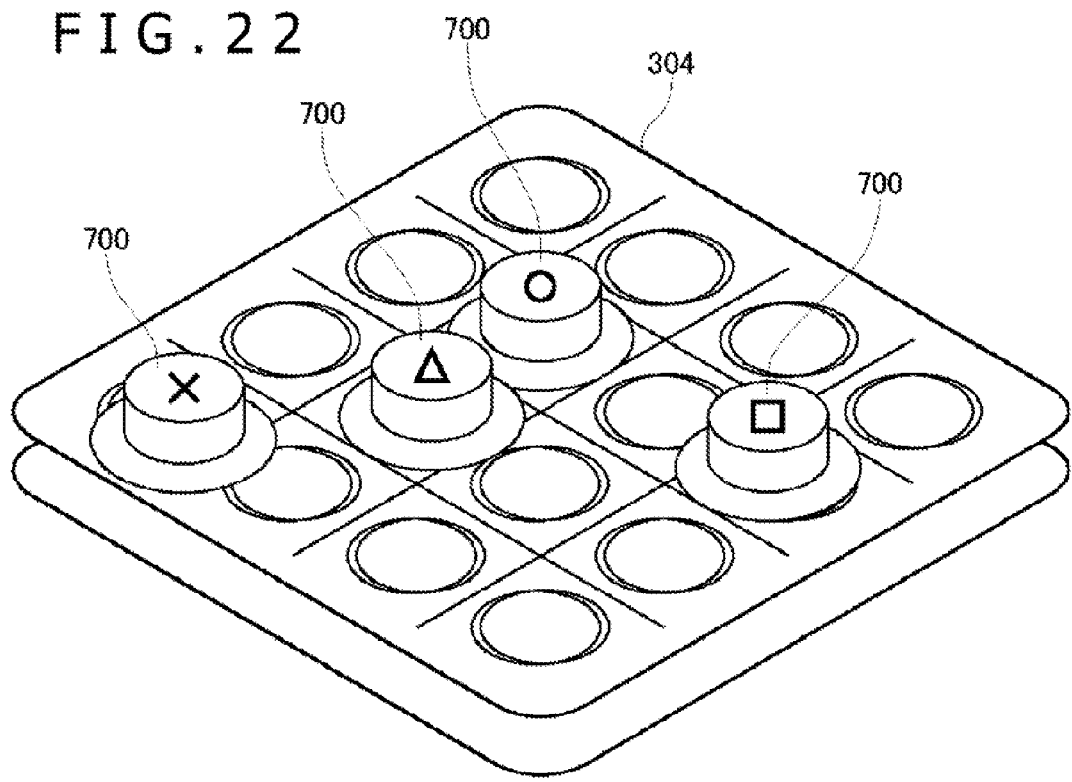
FIG. 22 is a view depicting a manner when a mechanical button is placed on a top plate of an RFID tag.

FIGS. 21(a) to 21(c) are views depicting different examples of an application which utilizes the touch sensor 500. More particularly, FIGS. 21(a) to 21(c) are views depicting a configuration of a movement type mechanical button 700. Further, FIG. 22 is a view depicting a manner when the mechanical button 700 depicted in FIGS. 21(a) to 21(c) is placed on the top plate 340 of the RFID tag 400.

FIGS. 21(a) to 21(c) depict configurations different from each other for implementing the mechanical button 700. In the example depicted in FIG. 21(a), the mechanical button 700 is configured by accommodating the RFID tag 400 and an elastic member 708 in a space covered with a deformable side face cover 710 and an upper face cover 702. The upper face cover 702 is coupled with the elastic member 708 such that, if the user depresses the upper face cover 702, then a click feeling can be enjoyed from the resistance of the elastic member 708. The RFID tag 400 is coupled with the upper face cover 702 at the inner side of the mechanical button 700.

The mechanical button 700 depicted in FIG. 21(b) is configured by accommodating the elastic member 708 in a space covered with the deformable side face cover 710 and a conductive member 704. In the example depicted in FIG. 21(b), the RFID tag 400 is coupled with the conductive member 704 at the outer side of the mechanical button 700. If the mechanical button 700 depicted in FIG. 21(b) is depressed by the user, then a click feeling can be enjoyed from the resistance of the elastic member 708. At the same time, the conductive member 704 and the top plate 340 are brought into contact with each other, and the touch sensor 500 can detect a touch thereby.

Similarly to the example depicted in FIG. 21(a), the mechanical button 700 depicted in FIG. 21(c) is configured by accommodating the RFID tag 400 and the elastic member 708 in the space covered with the deformable side face cover 710 and the upper face cover 702. Further, the RFID tag 400 is coupled with the upper face cover 702 at the inner side of the mechanical button 700.

In the example depicted in FIG. 21(c), the conductive member 704 is arranged at the outer side of the upper face cover 702 and the lower side (side contacting with the top plate 340) of the RFID tag 400 and the conductive members are electrically coupled with each other through a conductive line 706. Therefore, if the user depresses the mechanical button 700 depicted in FIG. 21(c), then a finger of the user electrically touches with the top plate 340 through the two conductive members 704 and the conductive line 706. Consequently, the touch sensor 500 can detect a touch.

Since the mechanical button 700 can be moved, it can be arranged freely on the top plate 340 as depicted in FIG. 22. The type of the mechanical button 700 can be detected by the built-in RFID tag 400, and presence or absence of a depression of the mechanical button 700 is detected by the touch sensor 500. Since the structure is simple, the fabrication cost can be suppressed and a high degree of durability can be implemented. Also the degree of freedom in design can be raised.

It is to be noted that, while the touch sensor 500 is described taking a touch sensor of the electrostatic capacitance method as an example, the touch sensor 500 is not limited to a touch sensor of the electrostatic capacity type but can be implemented even if a touch sensor of the resistance film type, a pressure sensor, a vibration sensor, a mechanical switch, a combination of an optical sensor and an LED or the like is used. Especially, where a pressure sensor or a vibration sensor is used for the touch sensor 500, in the reader 300 for an RFID tag, the top plate 340 and the antenna 308 arranged and a touch sensor 500 such as a pressure sensor or a vibration sensor is stacked and arranged in order.

Sixth Modification

In the foregoing description, principally a case is described in which each of the detection targets of the reader 300 for an RFID tag includes only one RFID tag 400. In a sixth modification, the detection target of the reader 300 for an RFID tag includes a plurality of RFID tags 400.

Figure 23:
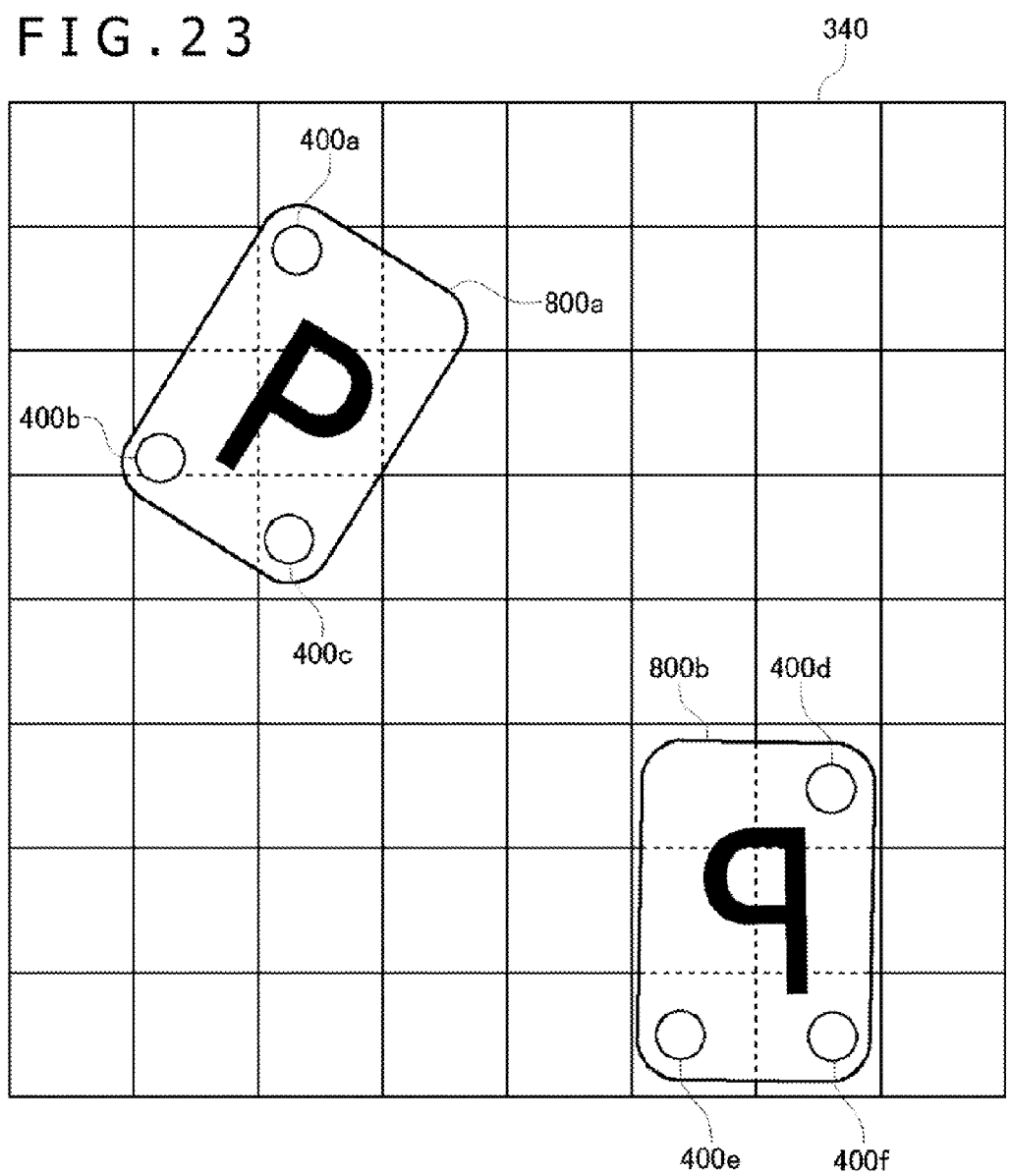
FIG. 23 is a view depicting a manner in which a detection target according to a sixth modification is placed on a top plate of a reader for an RFID tag.

FIG. 23 is a view depicting a manner in which a detection target 800 according to the sixth modification is placed on the top plate 340 of the reader 300 for an RFID tag. In the example depicted in FIG. 23, a detection target 800a and another detection target 800b of the card type are placed on the top plate 340. In each of the detection target 800a and the detection target 800b, three RFID tags 400 are built in. More particularly, the detection target 800a includes an RFID tag 400a, another RFID tag 400b and a further RFID tag 400c, and the detection target 800b includes an RFID tag 400d, another RFID tag 400e and a further RFID tag 400f.

As exemplified in FIG. 23, on the detection target 800 according to the sixth modification, three or more RFID tags 400 are arranged. Here, the RFID tags 400 are disposed in a spaced relationship from each other by a distance within which the antenna 308 can detect the RFID tags 400, namely, by a distance within which the resolution performance of the antenna 308 is higher than that of the coil antennae. Consequently, the software 206 for implementing the application can decide an orientation or a rotational angle of the detection targets 800 placed on the top plate 340 on the basis of an existing position of the RFID tags 400 detected by the tag detection part 314. FIG. 23 depicts that the detection target 800a is inclined by approximately 30 degrees in the clockwise direction and also a character P described on the detection target 800a is inclined.

The software 206 can also decide the front surface or the reverse surface of a card type detection target 800 placed on the top plate 340 on the basis of the existing position of a plurality of RFID tags 400 detected by the tag detection part 314. In the example depicted in FIG. 23, the front surface and the reverse surface of the detection target 800b are inverted in comparison with those of the detection target 800a and also a character P described on the detection target 800b is a mirror character. It is to be noted that, in order to decide the front surface or the reverse surface of the detection target 800, it is preferable to arrange the three or more RFID tags 400 so as not to be juxtaposed on one straight line. More particularly, an arbitrary one of the three RFID tags 400 is arranged so as to exist at a position displaced from a straight line which passes the other two ones of the RFID tags 400.

It is to be noted that, where the detection target 800 is a three-dimensional object, for example, like a figure, it has neither front surface nor reverse surface when the detection target 800 is placed on the top plate 340. In such a case as just described, the detection target 800 may include at least two RFID tags 400. The software 206 can decide a stereoscopic inclination of the detection target 800 in a three-dimensional space placed on the top plate 340.

REFERENCE SIGNS LIST

100 Near-field wireless communication system, 200 Information processing apparatus, 202 Communication unit, 204 Operating system, 206 Software, 212 Transmission power acquisition unit, 300 Reader, 301 Game plate, 302 Communication unit, 303 Arithmetic operation unit, 304 Modulation part, 306 Transmission and reception unit, 308 Antenna, 310 Antenna selection switch, 312 Antenna changeover controlling part, 314 Detection part, 316 Changeover pattern storage unit, 318 Demodulation part, 330 First switch circuit, 332 Second switch circuit, 334 Switch selection section, 340 Top plate, 342 Application placement area, 344 General-purpose placement area, 360 First matching circuit, 362 Second matching circuit, 364 Touch detection part, 400 RFID tag, 404 Demodulation part, 408 Tag antenna, 418 Modulation part, 420 Arithmetic operation unit, 422 Transmission power acquisition unit, 424, 500 Touch sensor, 502 Sensor module, 504 First electrode, 506 Second electrode, 508 Conductor, 510 First dielectric, 512 Second dielectric, 700 Mechanical button, 702 Upper face cover, 704 Conductive member, 708 Elastic member, 710 Side face cover, 800 Detection target.

INDUSTRIAL APPLICABILITY

The present invention can be utilized for a reader for an RFID (Radio Frequency IDentification) for near-field wireless communication and a near-field wireless communication system.

The invention claimed is:

1. A reader for an RFID (Radio Frequency IDentification) tag for near-field wireless communication, comprising:
    a transmission and reception unit which transmits a carrier wave to the RFID tag and receives a carrier wave transmitted from the RFID tag;
    the transmission and reception unit including
    a modulation part which generates a carrier wave modulated with data to be transmitted to the RFID tag, and
    an antenna selection switch in which a plurality of antennae transmitting and receiving data to and from the RFID tag arranged with an extent within a predetermined range and which selects one antenna to be used for transmission and reception of data from among the plurality of antennae;
    the reader for an RFID tag further including
    an antenna changeover controlling part which changes over the antenna to be selected by the antenna selection switch;
    a detection part which acquires, when the carrier wave transmitted from the RFID tag is received by any of the plurality of antennae, information indicative of the antenna selected by the antenna selection switch under a control of the antenna changeover controlling part;
    a top plate receiving the RFID tag placed thereon; and
    a touch sensor detecting presence or absence of a touch with the top plate.

2. The reader for an RFID tag for near-field wireless communication according to claim 1, wherein the detection part specifies an existing position of the RFID tag within a range within which the plurality of antennae are arranged using the information indicative of the antenna selected by the antenna selection switch under the control of the antenna changeover controlling part.

3. The reader for an RFID tag for near-field wireless communication according to claim 1, wherein
    each of the plurality of antennae has a communication range within which the antenna is capable of communicating with the RFID tag; and
    the transmission and reception unit is arranged within the predetermined range such that part of the communication range of each of the plurality of antennae overlaps with part of the communication range of one or more different one of the antennae.

4. The reader for an RFID tag for near-field wireless communication according to claim 1, wherein the modulation part generates the carrier wave in accordance with a communication standard of NFC (Near Field Communication).

5. The reader for an RFID tag for near-field wireless communication according to claim 1, wherein
    the antenna changeover controlling part changes over the antenna to be selected by the antenna selection switch in accordance with a changeover pattern which defines timings of changeover of the antenna to be selected by the antenna selection switch; and
    a changeover pattern defined by the changeover pattern is configured so as to be capable of being changed by an external apparats coupled for communication with the reader for an RFID tag.

6. The reader for an RFID tag for near-field wireless communication according to claim 1, wherein,
    where a number of plural antennae is represented by A and two divisors of the number A are represented by m and n (m * n=A), the antenna selection switch includes:
    a first switch circuit capable of selecting m terminals individually coupled with n antennae; and
    a second switch circuit capable of selecting n terminals individually coupled with m antennae; and
    each of the plurality of antennae
    (1) electrically couples with the antenna selection switch so as to be uniquely specified on a basis of a combination of the terminal coupled by the first switch circuit and the terminal coupled by the second switch circuit; and
    (2) couples with the antenna selection switch such that no any other antenna is included in a loop configured from a current path from the terminal coupled by the first switch circuit to the terminal coupled by the second switch circuit.

7. The reader for an RFID tag for near-field wireless communication according to claim 1,
    wherein the reader for an RFID tag for near-field wireless communication is configured by stacking the top plate, the plurality of antennae and touch sensor in this order.

8. The reader for an RFID tag for near-field wireless communication according to claim 1, wherein
    the touch sensor is an electrostatic capacity type touch sensor;
    the reader for an RFID tag for near-field wireless communication further comprises a first dielectric, a conductor and a second dielectric; and
    the reader for an RFID tag for near-field wireless communication is configured by stacking the top plate, the plurality of antennae, the first dielectric, the conductor, the second dielectric and the touch sensor in this order.

9. A near-field wireless communication system, comprising:

one or more RFID tags for near-field wireless communication;

a reader for an RFID tag for near-field wireless communication;

software controlling the reader for an RFID tag; and an information processing apparatus which couples for communication with the reader for an RFID tag and executes the software;

wherein the reader for an RFID tag includes a transmission and reception unit which transmits a carrier wave to the RFID tag or tags and receives a carrier wave transmitted from the RFID tag or tags;

the transmission and reception unit includes a modulation part which generates a carrier wave modulated with data to be transmitted to the RFID tag or tags, an antenna selection switch in which a plurality of antennae transmitting and receiving data to and from the one or more RFID tags arranged with an extent within a predetermined range and which selects one antenna to be used for transmission and reception of data from among the plurality of antennae;

the reader for an RFID tag further includes an antenna changeover controlling part which changes over an antenna to be selected by the antenna selection switch; and a tag detection part which acquires, when the carrier wave transmitted from any of the one or more RFID tags is received by one of the plurality of antennae, information indicative of the antenna selected by the antenna selection switch under a control of the antenna changeover controlling part, and then detects existing positions of the RFID tags which transmit the carrier wave;

a top plate receiving the RFID tag placed thereon;

a touch sensor detecting presence or absence of a touch with the top plate; and the software controls the antenna changeover controlling part to cause the information processing apparatus for setting a changeover pattern defining timings of changeover of the antenna to be selected by the antenna selection switch.

10. The near-field wireless communication system according to claim 9, wherein the changeover pattern of the antennae to be selected by the antenna selection switch includes a scan pattern which defines that the plurality of antennae are selected while being successively changed over at predetermined time intervals; and the software controls the antenna changeover controlling part to cause the information processing apparatus for changing the time intervals in the scan pattern.

11. The near-field wireless communication system according to claim 9, wherein the changeover pattern of the antennae to be selected by the antenna selection switch includes a subset selection pattern which defines that a subset configured from part of the plurality of antennae is selected while being successively changed over;

the software controls the antenna changeover controlling part to cause the information processing apparatus for changing the antennae which configure the subset which is a scan target in the subset selection pattern.

12. The near-field wireless communication system according to claim 9, wherein each of the one or more RFID tags includes:

a tag side antenna which receives the carrier wave transmitted from the reader for an RFID tag and transmits the carrier wave to the reader for an RFID tag;

a touch sensor which detects a touch with the RFID tag by a user;

an arithmetic operation unit which generates, when a touch is detected by the touch sensor, data of information indicative of the detection; and a modulation part which generates the carrier wave modulated by the data generated by the arithmetic operation unit in order to transmit the carrier wave to the reader for an RFID tag through the tag side antenna.

13. The near-field wireless communication system according to claim 9, further comprising:

a top plate receiving an RFID tag placed thereon;

wherein the software decides, when a detection target including a plurality of RFID tags for near-field wireless communication is placed on the top plate, an orientation of the detection target placed on the top plate on a basis of existing positions of the plurality of RFID tags included in the detection target detected by the tag detection part.

14. The near-field wireless communication system according to claim 13, wherein, when a planar-shaped detection target including a plurality of RFID tags for near-field wireless communication is placed on the top plate, the software decides a front surface or a reverse surface of the detection target placed on the top plate on the basis of existing positions of the plurality of RFID tags included in the detection target detected by the tag detection part.

* * * * *